(12) United States Patent
Lippincott et al.

(10) Patent No.: US 10,649,870 B1
(45) Date of Patent: May 12, 2020

(54) RELIABLE MAP-REDUCE COMMUNICATIONS IN A DECENTRALIZED, SELF-ORGANIZING COMMUNICATION ORBIT OF A DISTRIBUTED NETWORK

(71) Applicant: Tanium Inc., Emeryville, CA (US)

(72) Inventors: Lisa Lippincott, Berkeley, CA (US);
David Hindawi, Berkeley, CA (US);
Orion Hindawi, Piedmont, CA (US);
Peter Lincroft, Albany, CA (US)

(73) Assignee: TANIUM INC., Emeryville, CA (US)

( * ) Notice: Subject to any disclaimer, the term of this patent is extended or adjusted under 35 U.S.C. 154(b) by 0 days.

(21) Appl. No.: 15/878,286

(22) Filed: Jan. 23, 2018

Related U.S. Application Data

(63) Continuation of application No. 15/136,790, filed on Apr. 22, 2016, now Pat. No. 9,910,752.
(Continued)

(51) Int. Cl.
*G06F 11/00* (2006.01)
*G06F 11/30* (2006.01)
*H04L 12/26* (2006.01)

(52) U.S. Cl.
CPC .......... *G06F 11/30* (2013.01); *H04L 43/0864* (2013.01)

(58) Field of Classification Search
CPC ......... G06F 17/30469; G06F 17/30306; G06F 11/0727; G06F 11/0751; G06F 11/0763;
(Continued)

(56) References Cited

U.S. PATENT DOCUMENTS 5,220,596 A * 6/1993 Patel ................. H04M 3/53325
379/88.27
5,842,202 A * 11/1998 Kon ..................... G06F 11/0727
(Continued)

FOREIGN PATENT DOCUMENTS

EP 1553747 A1 7/2005
EP 2493118 A1 8/2012

OTHER PUBLICATIONS

Abdalkarim Awad et al., Virtual Cord Protocol (VCP): A Flexible DHT-like Routing Service for Sensor Networks, In Proceedings of the 5th IEEE International Conference on Mobile Ad Hoc and Sensor Systems, 2008, 10 pgs. 133-142.
(Continued)

*Primary Examiner* — Bryce P Bonzo
*Assistant Examiner* — Jeison C Arcos
(74) *Attorney, Agent, or Firm* — Morgan, Lewis & Bockius LLP

(57) ABSTRACT

Method and system for providing message communications with failure detection and recovery are disclosed. At a respective node of a non-static collection of nodes forming a linear communication orbit: the node identifies, from among the non-static collection of nodes, a set of forward contacts distributed in a forward direction along the linear communication orbit; the node monitors a propagation state of a first query that has departed from the respective node to travel in the forward direction along the linear communication orbit; and upon detecting a propagation failure of the first query based on the monitoring, the node sends the first query directly to a first forward contact among the set of forward contacts to initiate a failure recovery process within at least part of a segment of the linear communication orbit between the respective node and the first forward contact of the respective node.

21 Claims, 9 Drawing Sheets

Related U.S. Application Data

(60) Provisional application No. 62/152,709, filed on Apr. 24, 2015.

(58) Field of Classification Search
CPC ........ H04M 3/53325; Y10S 707/99932; Y10S 707/99933; Y10S 707/99931
See application file for complete search history.

(56) References Cited

U.S. PATENT DOCUMENTS

| | | | |
|---|---|---|---|
| 5,949,755 A | 9/1999 | Uphadya et al. | |
| 6,049,828 A * | 4/2000 | Dev | G06F 11/2257 709/220 |
| 6,879,979 B2 | 4/2005 | Hindawi et al. | |
| 6,885,644 B1 | 4/2005 | Knop et al. | |
| 7,043,550 B2 | 5/2006 | Knop et al. | |
| 7,120,693 B2 | 10/2006 | Chang et al. | |
| 7,240,044 B2 * | 7/2007 | Chaudhuri | G06F 16/24545 |
| 7,299,047 B2 | 11/2007 | Dolan et al. | |
| 7,555,545 B2 | 6/2009 | McCasland | |
| 7,600,018 B2 | 10/2009 | Maekawa et al. | |
| 7,698,453 B2 | 4/2010 | Samuels et al. | |
| 7,720,641 B2 | 5/2010 | Alagappan et al. | |
| 7,761,557 B2 | 7/2010 | Fellenstein et al. | |
| 7,769,848 B2 | 8/2010 | Choy et al. | |
| 7,844,687 B1 | 11/2010 | Gelvin et al. | |
| 8,078,668 B2 | 12/2011 | Moreau | |
| 8,086,729 B1 * | 12/2011 | Hindawi | G06F 11/0709 709/224 |
| 8,139,508 B1 | 3/2012 | Roskind | |
| 8,185,612 B1 | 5/2012 | Arolovitch et al. | |
| 8,185,615 B1 | 5/2012 | McDysan et al. | |
| 8,271,522 B2 | 9/2012 | Mehul et al. | |
| 8,392,530 B1 | 3/2013 | Manapragada et al. | |
| 8,477,660 B2 | 7/2013 | Lee et al. | |
| 8,504,879 B2 | 8/2013 | Poletto et al. | |
| 8,510,562 B2 | 8/2013 | Ramakrishnan et al. | |
| 8,813,228 B2 * | 8/2014 | Magee et al. | |
| 8,885,521 B2 * | 11/2014 | Wang | H04L 41/12 370/217 |
| 8,903,973 B1 | 12/2014 | Hindawi et al. | |
| 8,904,039 B1 * | 12/2014 | Hindawi | H04L 12/6418 709/217 |
| 9,009,827 B1 | 4/2015 | Albertson et al. | |
| 9,059,961 B2 | 6/2015 | Hindawi et al. | |
| 9,246,977 B2 | 1/2016 | Hindawi et al. | |
| 9,609,007 B1 | 3/2017 | Rivlin et al. | |
| 9,667,738 B2 | 5/2017 | Hindawi et al. | |
| 9,716,649 B2 * | 7/2017 | Bent | H04L 45/02 |
| 9,769,037 B2 | 9/2017 | Hindawi et al. | |
| 9,800,603 B1 * | 10/2017 | Sidagni | H04L 63/1433 |
| 9,985,982 B1 | 5/2018 | Bartos et al. | |
| 10,095,864 B2 | 10/2018 | Hunt et al. | |
| 10,136,415 B2 | 11/2018 | Hindawi et al. | |
| 2001/0056461 A1 | 12/2001 | Kampe et al. | |
| 2002/0007404 A1 | 1/2002 | Vange et al. | |
| 2002/0042693 A1 | 4/2002 | Kampe et al. | |
| 2002/0073086 A1 | 6/2002 | Thompson et al. | |
| 2002/0198867 A1 * | 12/2002 | Lohman | G06F 16/24545 |
| 2003/0101253 A1 | 5/2003 | Saito et al. | |
| 2003/0131044 A1 | 7/2003 | Nagendra et al. | |
| 2003/0212676 A1 | 11/2003 | Bruce et al. | |
| 2003/0212821 A1 * | 11/2003 | Gillies | H04L 41/046 709/238 |
| 2004/0076164 A1 * | 4/2004 | Vanderveen | H04L 45/28 370/400 |
| 2004/0190085 A1 | 9/2004 | Silverbrook et al. | |
| 2005/0004907 A1 * | 1/2005 | Bruno | G06F 16/2462 |
| 2005/0108356 A1 | 5/2005 | Rosu et al. | |
| 2005/0108389 A1 | 5/2005 | Kempin et al. | |
| 2005/0195755 A1 | 9/2005 | Senta et al. | |
| 2006/0039371 A1 | 2/2006 | Castro et al. | |
| 2006/0128406 A1 | 6/2006 | Macartney | |
| 2007/0005738 A1 | 1/2007 | Alexion-Tiernan et al. | |
| 2007/0211651 A1 | 9/2007 | Ahmed et al. | |
| 2007/0230482 A1 | 10/2007 | Shim et al. | |
| 2008/0082628 A1 | 4/2008 | Rowstron et al. | |
| 2008/0133582 A1 | 6/2008 | Andersch et al. | |
| 2008/0258880 A1 | 10/2008 | Smith et al. | |
| 2008/0263031 A1 | 10/2008 | George et al. | |
| 2008/0288646 A1 | 11/2008 | Hasha et al. | |
| 2009/0125639 A1 | 5/2009 | Dam et al. | |
| 2009/0271360 A1 * | 10/2009 | Bestgen | G06F 16/24542 |
| 2009/0319503 A1 | 12/2009 | Mehul et al. | |
| 2009/0328115 A1 | 12/2009 | Malik | |
| 2010/0070570 A1 | 3/2010 | Lepeska | |
| 2010/0085948 A1 | 4/2010 | Yu et al. | |
| 2010/0094862 A1 * | 4/2010 | Bent | G06F 16/2471 707/716 |
| 2010/0296416 A1 * | 11/2010 | Lee | H04L 12/4637 370/258 |
| 2010/0306252 A1 | 12/2010 | Jarvis et al. | |
| 2011/0231431 A1 * | 9/2011 | Kamiwada | G06F 16/9535 707/769 |
| 2011/0271319 A1 | 11/2011 | Venable, Sr. | |
| 2012/0269096 A1 | 10/2012 | Roskind | |
| 2013/0110931 A1 | 5/2013 | Kim et al. | |
| 2013/0170336 A1 | 7/2013 | Chen et al. | |
| 2013/0276053 A1 | 10/2013 | Hugard, IV et al. | |
| 2014/0075505 A1 | 3/2014 | Subramanian | |
| 2014/0101133 A1 * | 4/2014 | Carston | G06F 16/24545 707/718 |
| 2014/0149557 A1 | 5/2014 | Lohmar et al. | |
| 2014/0164552 A1 | 6/2014 | Kim et al. | |
| 2014/0181295 A1 | 6/2014 | Hindawi et al. | |
| 2014/0244727 A1 | 8/2014 | Kang et al. | |
| 2014/0280280 A1 * | 9/2014 | Singh | G06F 16/24545 707/759 |
| 2014/0375528 A1 | 12/2014 | Ling | |
| 2015/0080039 A1 | 3/2015 | Ling et al. | |
| 2015/0149624 A1 | 5/2015 | Hindawi et al. | |
| 2015/0163121 A1 | 6/2015 | Mahaffey et al. | |
| 2015/0172228 A1 | 6/2015 | Zalepa et al. | |
| 2015/0256575 A1 | 9/2015 | Scott | |
| 2015/0373043 A1 | 12/2015 | Wang et al. | |
| 2016/0080408 A1 | 3/2016 | Coleman et al. | |
| 2016/0119251 A1 | 4/2016 | Solis et al. | |
| 2016/0269434 A1 | 9/2016 | DiValentin et al. | |
| 2016/0286540 A1 | 9/2016 | Hindawi et al. | |
| 2016/0352588 A1 | 12/2016 | Subbarayan et al. | |
| 2018/0191747 A1 | 7/2018 | Nachenberg et al. | |

OTHER PUBLICATIONS

Jae Woo Lee et al., 0 to 10k in 20 seconds: Bootstrapping Large-Scale DHT networks, 2011 IEEE International Conference on Communications, Jun. 9, 2011, pp. 1-6.

Hindawi, Office Action, U.S. Appl. No. 15/702,617, dated Jun. 1, 2018, 37 pgs.

Hindawi, Final Office Action, U.S. Appl. No. 15/702,617, dated Dec. 27, 2018, 54 pgs.

Hunt, Office Action dated Oct. 4, 2018, U.S. Appl. No. 15/215,468, 13 pgs.

Hunt, Notice of Allowance dated Jan. 24, 2019, U.S. Appl. No. 15/215,468, 8 pgs.

Hunt, Notice of Allowance dated Apr. 1, 2019, U.S. Appl. No. 15/215,468, 8 pgs.

Hunt, Office Action dated Sep. 10, 2018, U.S. Appl. No, 15/215,474, 10 pgs.

Hunt, Final Office Action dated Apr. 1, 2019, U.S. Appl. No. 15/215,474, 7 pgs.

Hunt, Notice of Allowance, U.S. Appl. No. 15/713,518, Apr. 10, 2019, 14 pgs.

Hood, Proactive Network-Fault Detection, Sep. 1997, 9 pages.

Mongeau, D., et al., "Ensuring integrity of network inventory and configuration data," Telecommunications Network Strategy and Planning Symposium, Networks 2004, 11th International Vienna, Austria, Jun. 13-16, 2004, 6 pgs.

Rao et al., "Optimal Resource Placement in Structured Peer-to-Peer Networks," Jul. 2010, IEEE Transactions on Parallel and Distributed Systems, vol. 21, No. 7, 16 pgs.

(56) References Cited

OTHER PUBLICATIONS

Stoica, I., et al., "Chord: A Scalable Peer-to-Peer Lookup Service for Internet Applications," SIGCOMM '01, Aug. 27-31, 2001, San Diego, California, 12 pages.
Tanium Inc, International Search Report and Written Opinion, PCT/US2013/076971, dated Apr. 4, 2014, 19 pgs.
Tanium Inc, International Preliminary Report on Patentability, PCT/US2013/076971, dated Jun. 23, 2015, 14 pgs.
Tanium Inc, International Search Report and Written Opinion, PCT/US2014/067607, dated Feb. 18, 2015, 15 pgs.
Tanium Inc, International Preliminary Report on Patentability, PCT/US2014/067607, dated May 31, 2016, 10 pgs.
Tanium Inc, International Search Report and Written Opinion, PCT/US2015/0020780, dated Jul. 2, 2015, 14 pgs.
Tanium Inc, International Preliminary Report on Patentability, PCT/US2015/0020780, dated Sep. 27, 2016, 9 pgs.
Weixiong Rao et al, "Optimal Resource Placement in Structured Peer-to-Peer Networks," IEEE Transactions on Parallel and Distributed Systems, vol. 21, No. 7, Jul. 2010, 16 pgs.
Jae Woo Lee, Henning Schulzrinne, Wolfgang Kellerer and Zoran Despotovic, 0 to 10k in 20 Seconds: Bootstrapping Large-Scale DHT Networks, pp. 1-6, Jun. 9, 2011 (Year: 2011).
Ion Stoica, Robert Morris, David Karger, M. Frans Kaashoek, Had Balakrishnan, Chord: A Scalable Peertopeer Lookup Service for Internet Applications, 2001, pp. 1-12 (Year: 2002).
Ping Wang, Baber Aslann, Cliff C. Zou, Peer-to-Peer Botnets: The Next Generation of Botnet Attacks, Jan. 2010, pp. 1-25 (Year: 2010).
Sean Rhea, Dennis Geels, Timothy Roscoe, and John Kubiatowicz, Handling Churn in a DHT, 2004, pp. 1-14 (Year: 2004).

* cited by examiner

At the respective node of a non-static collection of nodes forming the linear communication orbit:

┌─ 412 ──────────────────────────────────────────────┐
Determine a respective responsibility tier of the respective node for the first query based on a predetermined responsibility hierarchy rule, wherein the predetermined responsibility hierarchy rule assigns the non-static collection of nodes into a respective responsibility hierarchy for the first query
└────────────────────────────────────────────────────┘

┌─ 414 ──────────────────────────────────────────────┐
Determine whether the first query has reached beyond a respective responsibility range of the respective node for the first query based on the respective responsibility tier of the respective node for the first query ┌─ 416 ────────────────────────────────────────────┐
Monitoring the respective propagation state of the first query further includes:
   putting the first query into at least one of a series of forward states corresponding to the responsibility tier of the respective node for the first query based on a new known position of the first query in the linear communication orbit
└──────────────────────────────────────────────────┘

┌─ 418 ────────────────────────────────────────────┐
Monitoring the respective propagation state of the first query further includes:
   putting the first query into at least one of a series of forward states corresponding to the responsibility tier of the respective node for the first query based on a failure to receive an acknowledgement associated with a lower forward state than the at least one forward state within a predetermined timeout period
└──────────────────────────────────────────────────┘
└────────────────────────────────────────────────────┘

┌─ 420 ──────────────────────────────────────────────┐
Identify, from among the non-static collection of nodes, a respective set of backward contacts in a backward direction along the linear communication orbit
└────────────────────────────────────────────────────┘

Figure 4B

At the respective node of a non-static collection of nodes forming the linear communication orbit: ⟋ 424

Ⓒ

⟋ 430

Sending the second query directly to a second backward contact among the set of backward contacts further includes:
    sending the second query directly to the farthest live backward contact among the set of forward contacts after a respective attempt to send the second query directly to each backward contact located farther away from the respective node than said farthest live backward contact has failed

⟋ 432

Put the second query into at least one of a series of backward states corresponding to the respective responsibility tier of the respective node for the second query based on a new known position of the second query within the respective segment of the linear communication orbit between the second backward contact and the respective node

⟋ 434

Put the second query into at least one of a series of backward states corresponding to the respective responsibility tier of the respective node for the second query based on a failure to receive more answers for the second query for the respective segment of the linear communication orbit between the second backward contact and the respective node within a predetermined timeout period

⟋ 436

The respective predetermined responsibility hierarchy rule assigns the non-static collection of nodes into the respective responsibility hierarchy for the first query based on a similarity between a predetermined characteristic of the first query and a respective corresponding characteristic assigned to each node of the non-static collection of nodes

RELIABLE MAP-REDUCE COMMUNICATIONS IN A DECENTRALIZED, SELF-ORGANIZING COMMUNICATION ORBIT OF A DISTRIBUTED NETWORK

RELATED APPLICATIONS

This application is a continuation of U.S. application Ser. No. 15/136,970 filed Apr. 22, 2016, which claims priority to U.S. Provisional Patent Application Ser. No. 62/152,709, "Reliable Map-Reduce Communications in a Decentralized, Self-Organizing Communication Orbit of a Distributed Network," filed Apr. 24, 2015, both of which are hereby incorporated by reference in their entirety.

This application relates to U.S. patent application Ser. No. 13/797,946, filed Mar. 12, 2013, titled "System, Security and Network Management Using Self-Organizing Communication Orbits in Distributed Networks," now U.S. Pat. No. 9,246,977; U.S. patent application Ser. No. 12/412,623, filed Mar. 27, 2009, titled "Distributed Statistical Detection of Network Problems and Causes," now U.S. Pat. No. 8,086,729; U.S. patent application Ser. No. 13/084,923, filed Apr. 12, 2011, titled "Large-Scale Network Querying and Reporting," now U.S. Pat. No. 8,904,039; and U.S. patent application Ser. No. 13/107,625, filed May 13, 2011, titled "Parallel Distributed Network Management," now U.S. Pat. No. 8,903,973. Content of each of the above applications is hereby incorporated by reference in its entirety. The above applications are also referred to hereafter as "the Related Applications" or "the Incorporated Disclosure."

BACKGROUND

A managed network (e.g., an enterprise network) often includes a large number of machines and devices configured to perform a wide variety of functions. The amount of computing assets and the amount of data generated and used by these computing assets scale rapidly with the size of the network. Map-reduce operations on a network, such as collecting real-time information regarding systems and resources in the network and dynamically modifying and reallocating resources and data in the network, require a substantial amount of computation and communication resources.

In a centrally managed network, a central management server is responsible for issuing requests (e.g., requests for status updates, system management operations, and network management operations, etc.) to the targeted destination nodes in the network. These requests often take a long time to propagate through the network to the appropriate destination nodes. These latencies make real-time management of the machines in the network difficult. In addition, in a centralized managed network having thousands of targeted destination nodes, the central server can quickly become overwhelmed by the communication load and becomes a management bottleneck. Furthermore, a centralized management scheme is expensive to implement and maintain.

Some conventional systems attempt to ameliorate the problems of a centralized management scheme by performing some degree of aggregation or processing of data at intermediate control levels, resulting in a fixed hierarchical management structure between the network administrator and the end nodes. These systems also do not scale well, and these fixed hierarchical management structures themselves are difficult and complex to create and maintain, and are prone to problems and failures.

Previously, self-organizing linear communication orbits have been proposed to address the problems of the single server-based or hierarchical management structures described above. For example, in a distributed network where individual machines are self-organized into a linear communication orbit, map-reduce communications, such as those involving transmission of a question (e.g., a request for status updates or system management operation) and collection of a response for the query (e.g., an answer to the request for status updates or execution result of the system management operation), travel from one machine to the next along the linear communication orbit, while the aggregation of the responses are performed by each machine at its local level without the participation of any upper-level server(s). This provides fast and efficient communication in network management.

As described in the Related Applications, machines in a managed network may implement a set of rules that cause individual machines to directly interact with only a small number of machines in the network (i.e., a local neighborhood within the network), while the independent local actions of the individual machines collectively cause the individual machines to be self-organized into one or more communication orbits without global control or coordination by a server or an administrator. Such linear communication orbit provides a network management configuration that scales well, and makes real-time network management more feasible for large enterprise networks.

SUMMARY

Although self-organizing linear communication orbit provides a simple, fast, and cost-effective solution over conventional network management structures, some potential issues exist for such linear communication orbits. For example, in some implementations, a node in the linear communication orbit communicates with only a few nodes in its immediate neighborhood, and a break in the linear communication orbit (e.g., due to one or more lost or irresponsive nodes) requires a self-healing process to completely eliminate the break in the linear communication orbit before the query propagation process (e.g., including question propagation and answer collection) can be resumed and continued. Thus, the linear communication orbit is not sufficiently robust and efficient in such error situations.

In the present disclosure, a technique for providing a more robust self-organizing linear communication orbit for map-reduce communications in a distributed and decentralized network is provided. As will be shown in more details later in the specification, the disclosed technique, in various embodiments, allows the map-reduce communications to utilize network resources more efficiently, and with no particular device carrying more burden of organization, response to message failures, and result reduction than any other devices in the linear communication orbit. In other words, in some embodiments, the load of organization, failure detection and recovery, and result reduction are near-uniformly distributed over all the participating devices in the network. Furthermore, the solution relies on a set of common configuration and action rules that are implemented by each node in the network, such that the collective effect of the individual actions of the nodes can facilitate efficient and robust message communication, error detection, and error recovery capabilities.

Specifically, the solution addresses the drawbacks of the previously proposed self-organizing linear commutation orbit by allowing each node to be able to access other parts of the orbit through a small set of direct contacts spread out along the entire orbit, such that error detection and recovery efforts are no longer strictly confined between immediate neighboring nodes, but rather, can proceed over a number of fast tracks (sometimes herein called direct connections) that can skip over different sized segments of the orbit as needed.

In addition, the solution provided herein also allows formation of dynamic responsibility hierarchies for queries that enter the network, such that intermediate aggregation and management become possible for each query without overly burdening a fixed subset of the machines in the network. A predetermined responsibility hierarchy rule (e.g., a similarity rule that matches randomly assigned channel numbers between nodes and queries) is used by the nodes to determine their own responsibility tiers in a respective responsibility hierarchy for each particular query. The responsibility hierarchy rule (e.g., including the assignment of the channel numbers to nodes and queries) is designed such that, on average, over time, all nodes in the network share the burden for handling the message communication, error recovery, error detection, result aggregation, result reporting, etc., roughly equally (or, alternatively, according to their capabilities, using an intentional bias introduced in the assignment of the channel numbers based on the machines' capabilities).

In some embodiments, a method of providing message communications with failure detection and recovery in a linear communication orbit includes: at a respective node of a non-static collection of nodes forming the linear communication orbit: identifying, from among the non-static collection of nodes, a respective set of forward contacts distributed in a forward direction along the linear communication orbit; monitoring a respective propagation state of a first query that has departed from the respective node to travel in the forward direction along the linear communication orbit; and upon detecting a respective propagation failure of the first query based on the monitoring, sending the first query directly to a first forward contact among the set of forward contacts to initiate a respective failure recovery process within at least part of a respective segment of the linear communication orbit between the respective node and the first forward contact of the respective node.

In some embodiments, the first forward contact is the closest live forward contact to the respective node among the set of forward contacts that is within an unanswered range of the first query on the linear communication orbit.

In some embodiments, sending the first query directly to the first forward contact among the set of forward contacts further includes: sending the first query directly to the first forward contact among the set of forward contacts after a respective attempt to send the first query directly to each forward contact located closer to the respective node than the first forward contact has failed.

In some embodiments, the method further includes: determining a respective responsibility tier of the respective node for the first query based on a predetermined responsibility hierarchy rule, wherein the predetermined responsibility hierarchy rule assigns the non-static collection of nodes into a respective responsibility hierarchy for the first query; and determining whether the first query has reached beyond a respective responsibility range of the respective node for the first query based on the respective responsibility tier of the respective node for the first query.

In some embodiments, monitoring the respective propagation state of the first query further includes: putting the first query into at least one of a series of forward states corresponding to the responsibility tier of the respective node for the first query based on a new known position of the first query in the linear communication orbit.

In some embodiments, monitoring the respective propagation state of the first query further includes: putting the first query into at least one of a series of forward states corresponding to the responsibility tier of the respective node for the first query based on a failure to receive an acknowledgement associated with a lower forward state than the at least one forward state within a predetermined timeout period.

In some embodiments, the method further includes: identifying, from among the non-static collection of nodes, a respective set of backward contacts in a backward direction along the linear communication orbit; receiving a second query from a first backward contact among the respective set of backward contacts, the second query having a respective propagation state indicating a respective propagation failure of the second query between the first backward contact of the respective node and a node positioned between the first backward contact and the respective node in the linear communication orbit; and in response to receiving the second query, sending the second query directly to a second backward contact among the set of backward contacts to recover from the respective propagation failure of the second query, wherein the second backward contact is located between the respective node and the first backward contact in the linear communication orbit, and wherein the second backward contact resumes propagation of the second query within at least part of a respective segment of the linear communication orbit between the second backward contact and the respective node.

In some embodiments, the method further includes: determining a respective responsibility tier of the respective node for the second query based on the predetermined responsibility hierarchy rule, wherein the predetermined responsibility hierarchy rule assigns the non-static collection of nodes into a respective responsibility hierarchy for the second query, wherein the respective responsibility hierarchies of the first query and the second query are different from each other.

In some embodiments, sending the second query directly to the second backward contact among the set of backward contacts further includes: identifying the farthest live backward contact among the set of backward contacts that is within a respective unanswered range of the second query.

In some embodiments, sending the second query directly to the second backward contact among the set of backward contacts further includes: sending the second query directly to the farthest live backward contact among the set of backward contacts after a respective attempt to send the second query directly to each backward contact located farther away from the respective node than said farthest live backward contact has failed.

In some embodiments, the method further includes: putting the second query into at least one of a series of backward states corresponding to the respective responsibility tier of the respective node for the second query based on a new known position of the second query within the respective segment of the linear communication orbit between the second backward contact and the respective node.

In some embodiments, the method further includes: putting the second query into at least one of a series of backward states corresponding to the respective responsibility tier of the respective node for the second query based on a failure to receive more answers for the second query for the respective segment of the linear communication orbit between the second backward contact and the respective node within a predetermined timeout period.

In some embodiments, the respective predetermined responsibility hierarchy rule assigns the non-static collection of nodes into the respective responsibility hierarchy for the first query based on a similarity between a predetermined characteristic of the first query and a respective corresponding characteristic assigned to each node of the non-static collection of nodes.

In some embodiments, the set of forward contacts are distributed along the linear communication orbit in the forward direction away from the respective node in an order of increasing similarity between the respective corresponding characteristic assigned to the respective node and the respective corresponding characteristic assigned to each of the set of forward contacts.

In some embodiments, the set of backward contacts are distributed along the linear communication orbit in the backward direction away from the respective node in an order of increasing similarity between the respective corresponding characteristic assigned to the respective node and the respective corresponding characteristic assigned to each of the set of backward contacts.

In some embodiments, the respective node and each node in the sets of backward and forward contacts for the respective node identify each other as a direct contact based on a common contact selection rule implemented by the respective node and said each node.

In some embodiments, a computer system (e.g., node 102 (FIGS. 1, 5)) includes one or more processors and memory storing one or more programs for execution by the one or more processors, the one or more programs include instructions for performing, or controlling performance of, the operations of any of the methods described herein. In some embodiments, a non-transitory computer readable storage medium storing one or more programs, the one or more programs comprising instructions, which, when executed by a computer system (e.g., node 102 (FIGS. 1, 5)) with one or more processors, cause the computer system to perform, or control performance of, the operations of any of the methods described herein. In some embodiments, a computer system (e.g., node 102 (FIGS. 1, 5)) includes means for performing, or controlling performance of, the operations of any of the methods described herein.

Other embodiments and advantages are apparent to those skilled in the art in light of the descriptions and drawings in this specification.

BRIEF DESCRIPTION OF THE DRAWINGS

FIGS. 4A-4E are flow diagrams illustrating a method of providing message communications with failure detection and recovery in a linear communication orbit in accordance with some embodiments.

Like reference numerals refer to corresponding parts throughout the drawings.

DESCRIPTION OF EMBODIMENTS

Figure 1:
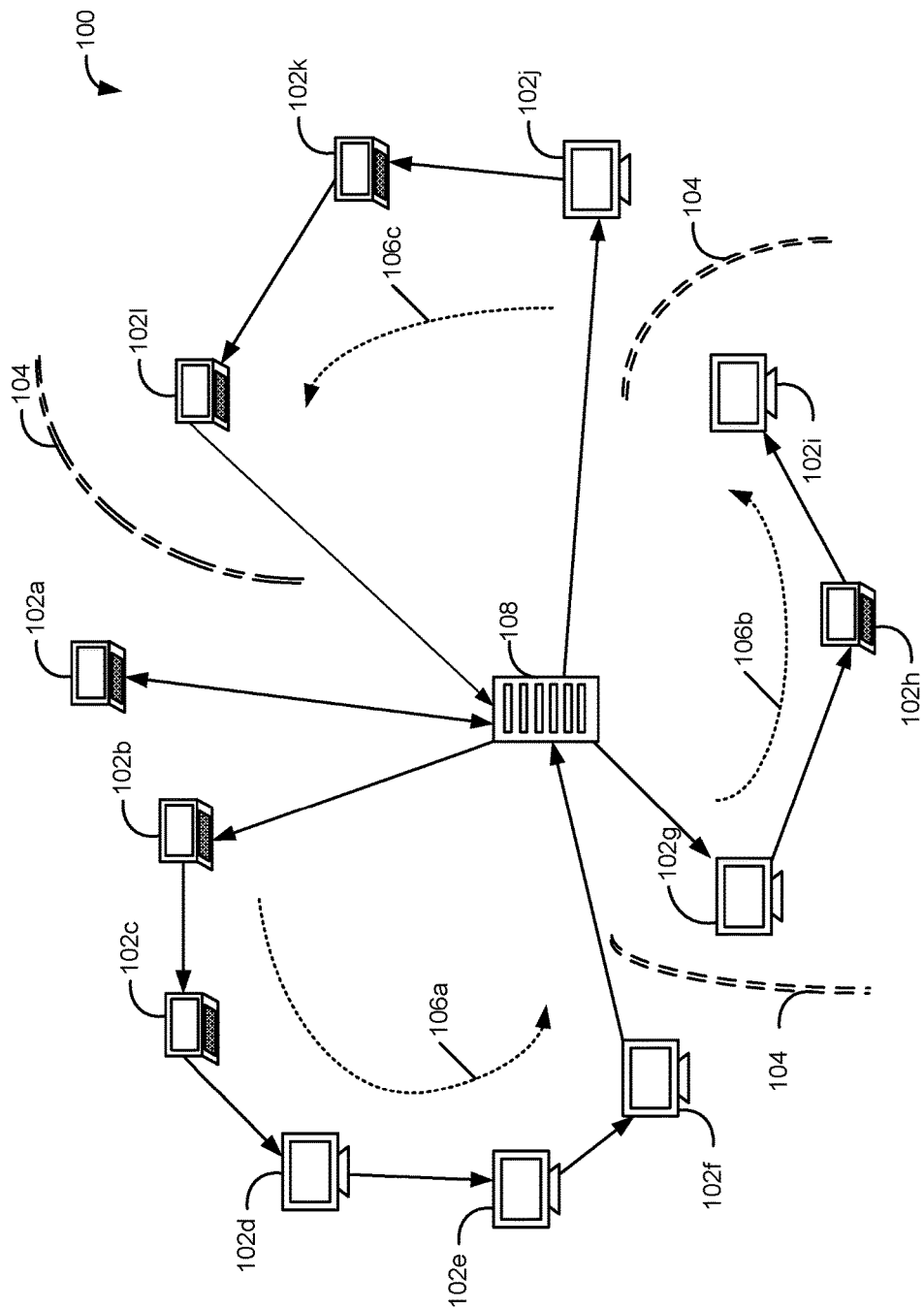
FIG. 1 illustrates a linear communication orbit for supporting map-reduce communications in a managed network in accordance with some embodiments.

FIG. 1 illustrates a managed network 100 comprising a plurality of interconnected machines or nodes 102 (including 102a-1), e.g., computers, servers, mobile devices, and other networked devices. Examples of managed network 100 include an enterprise network or another network under common management. In some embodiments, at least some of machines 102 coupled to managed network 100 are distributed across different geographical areas and/or localized at the same physical location. In some embodiments, machines 102 coupled to managed network 100 are divided into several sub-networks separated by one or more firewalls 104.

In some embodiments, machines 102 currently coupled to network 100 are self-organized into one or more contiguous segments 106 of a single linear communication orbit. In some embodiments, each contiguous segment 106 is viewed as a respective linear communication orbit. In some embodiments, each linear communication orbit is used to support map-reduce communications (e.g., system, security and network management communications) within managed network 100.

In some embodiments, managed network 100 also includes server 108 that facilitates the creation and maintenance of the one or more contiguous segments 106. The server 108 may be relatively lightweight, and may be elected from machines 102 in the network.

In some embodiments, as shown in FIG. 1, the linear communication orbit linking all of the machines coupled to network 100 includes a respective communication channel between each pair of adjacent machines in an ordered sequence of all machines 102 in network 100. In some embodiments, communication between a pair of adjacent machines 102 (e.g., 102g and 102f) across a firewall 104 may need to be bridged by an intermediate server (e.g., server 108).

In some embodiments, in an error-free map-reduce communication situation, each machine 102 receiving a communication message (e.g., a message including a question part, and an answer part) from its upstream neighbor node acts upon the message by providing an update to the message based on its local state or information, performing some aggregation of the information in the message, and/or forwarding the message to its downstream neighbor node along the linear communication orbit. Essentially, each machine expends a small amount of resources to take on a small part of the duties of data aggregation without being overly burdened. More details on how the system, security and network management messages are propagated to and collected from machines 102 in network 100 through linear communication orbit(s) 106 are provided in the Incorporated Disclosure set forth above.

An important feature of the linear communication orbit(s) 106 is that they are automatically formed without global, continuous, and/or active intervention by any network administrative program or personnel. Each machine 102 joining network 100 is equipped with (or provided with) a set of predetermined rules. According to the set of predetermined rules, each machine 102 finds its immediate neighbor machines and coordinates with these immediate neighbor machines to self-organize into a local segment of the linear communication orbit. The local segments of adjacent machines overlap and fuse into a contiguous segment of the linear communication orbit. In some embodiments, the linear communication orbit organically grows or contracts as machines join and leave network 100, without global, continuous, and/or active intervention by any network administrative programs or personnel. Although all machines 102 implement the same set of rules and each machine only directly interacts with its immediate neighbor machines to facilitate the formation of the orbit, the rules are designed in a way that causes global coordination of the machines' independent local actions. The global coordination results in self-organization and automatic repair and maintenance of the linear communication orbit(s) 106.

In some embodiments, all machines 102 coupled to network 100 are sorted into an ordered sequence according to a respective unique identifier associated with each machine 102. These identifiers are also referred to as the addresses of the machines in the network. For example, in some embodiments, respective IP addresses of machines 102 are used as the identifiers to sort the machines into an ordered sequence. In some embodiments, the machines are sorted according to decreasing IP address values, an upstream direction of the linear communication orbit is the direction of increasing IP address values, and a downstream direction of the linear communication orbit is the direction of decreasing IP address values. In some embodiments, the machines are sorted according to increasing IP address values, an upstream direction of the linear communication orbit is the direction of decreasing IP address values, and a downstream direction of the linear communication orbit is the direction of increasing IP address values.

In some embodiments, other types of unique identifiers or addresses may be used, each type having a deterministic way of sorting the unique identifiers or addresses of that type into an ordered sequence. In any case, given the identifiers or addresses of two machines in the network, the relative order of the two machines and their distances in the linear communication orbit (also referred to as an interval between the two machines) can be determined. In some embodiments, not all possible addresses are occupied by a corresponding machine in the network.

It is understood that communication in a network has cost, and that a message sent from one machine to another machine in the network may fail. The probability of failure generally increases with the distance between the originator and the destination of the message. At the same time, the cost of a message also generally increases with the distance between the originator and the destination of the message. Message transmission takes time, and the time that the message spends in transit between the message originator and the message destination generally increases with the distance between the originator and the destination of the message. Furthermore, messages may interfere with one another, increasing the failure rate, cost, and/or transit time.

Given the cost and the possibility of failures of messages described above, an efficient method of communication that is robust against message failures is needed. Although a linear communication orbit in its simplest form is efficient for map-reduce communications, it has its vulnerabilities. For example, if a section of the linear orbit is broken, a long time is needed for a node to find out which nodes or section of the linear orbit should be skipped, and there is no easy way to try to recollect the answers from the nodes that are skipped when the nodes become responsive again at a later time.

The solution described herein allows the failure detection and recovery task to be distributed evenly among all nodes along the ring over time and across many queries. The solution is based on a matching method (also referred to as a responsibility hierarchy rule) that assigns different amount of responsibilities to different nodes in the linear communication orbit in monitoring the status of each query, and, such that, over time, statistically, each node will take on different amount of responsibilities for different queries, but roughly equal amount of responsibilities overall across all queries as other nodes. Thus, the load on the nodes along the linear communication orbit is evenly distributed, and there is not one particular node or one particular group of nodes that are more burdened with the communication, error detection, and error recovery tasks than other nodes. As such, the communication is more robust to failures of individual nodes and network instabilities, since no node will become the bottleneck of the whole network.

In addition, each node implements a set of common rules such that all the nodes in the linear communication orbit know what to do with respect to each query it receives or knows about, without requiring excessive back and forth interactive communications between the nodes themselves or between the nodes and the central management of a server or administrator. This set of common rules are different from the set of common rules for establishing and maintaining the linear communication orbit as described in the Incorporated Disclosure, and can be used in addition to the set of common rules for establishing and maintaining the linear communication orbit.

The basic solution includes the following aspects in some embodiments.

(1) Fast Tracks and Direct Contacts.

The linear communication orbit is treated as a ring-shaped orbit with the last node of the linear communication orbit serving as the upstream neighbor of the first node in the ring-shaped orbit. A configuration rule is used to establish a respective set of fast tracks for each node in the ring. Each fast track of a node connects the node directly with another node that is separated from the node by zero or more other nodes (and typically one or more other nodes) in the ring. For each node, each of its fast tracks in the forward or downstream direction of the ring connects the node with a downstream node relative to the node, and each of its fast tracks in the backward or upstream direction of the ring connects the node with an upstream node relative to the node. Each node can use one of its fast tracks to skip a segment of the ring (including the nodes within that segment) and reach the node at the other end of the fast track directly, thus two nodes connected by a fast track are also referred to direct contacts of each other. The respective set of forward contacts for each node are ranked based on their relative distances away from the node on the orbit, and the node can use the direct connection with each more distantly located forward contact to skip an increasingly large segment of the ring-shaped orbit in the forward direction. Similarly, the respective set of backward contacts for each node are also ranked based on their relative distances away from the node on the orbit, and the node can use the direct connection with each more distantly located backward contact to skip an increasingly large segment of the ring-shaped orbit in the backward direction. There are other constraints on the selection of direct contacts which will be introduced later in the specification.

In some embodiments, in the error detection process, a node can forward a query to a suitably located forward contact to skip a section of the ring when encountering a broken link in the forward direction (e.g., having received a timeout after attempting to send a query message forward to a node in the unanswered range of the ring). By skipping forward using a fast track, rather making an attempt to reach each non-responsive forward node in sequence and receiving a timeout for each of them before reaching a responsive node, the query propagation can continue without being held up by a single point of failure. In addition, the node tries to forward the query to its nearest forward contact first, such that the smallest section of the ring that it is able to skip is skipped in order for the node to reach a responsive forward contact. If and when the attempt to forward the query to its nearest forward contact fails, the node tries to forward the query to the next nearest forward contact along the ring. This attempt to skip forward continues until a live responsive forward contact is found. In this error detection process, the node will try to send the query to a more distantly located forward contact (and correspondingly, skip a larger segment of the ring) only if the node has already received timeouts for all of the forward contacts located nearer than said more distantly located forward contact.

In addition, in the error recovery process, a node can send a query backward to a backward contact to try to recover at least part of a skipped section of the ring (note: the skipping had been performed by another node located earlier in the ring). The node tries to send the query backward to its farthest backward contact in the skipped section of the ring first, such that as much as the skipped section can be recovered in the skipped section. Each node in the skipped section that receives the query from one of its own forward contacts may send the query further backward to its own backward contact within the skipped section, such that the query can reach as far back as possible within the skipped section to gather answers from as many skipped responsive nodes in the skipped section as possible. When the query comes back from the skipped section with more answers, the node can add its own answer before sending the query forward along the ring-shaped orbit. Unlike in the error detection process, a node in the unanswered range tries to send the query to its farthest backward contact in the unanswered range first. If and when the attempt to send the query to its farthest backward contact in the unanswered range fails, the node tries to send the query to the next farthest backward contact along the ring. This attempt to recover at least part of the skipped segment of the ring continues until a live responsive backward contact is found. In this error recovery process, the node will try to send the query to a nearer backward contact (and correspondingly, recover a smaller segment of the ring) only if the node has already received timeouts for all of the backward contacts located farther away than said nearer forward contact in the unanswered range.

By establishing the set of forward and backward fast tracks for each node in the ring using a simple rule implemented by each node in the linear orbit, a network of fast tracks can be established automatically by the collective behaviors of the individual nodes without central management or control. Any location on the ring can be reached quickly through the actions of a smaller number of nodes (e.g., by skipping segments in the ring), rather than sequentially one node at a time. Thus, regardless of where the break occurs in the ring or how extensive the break may be, the query can propagate past the break relatively quickly using the forward fast track(s), and at the same time, many of the responsive nodes in the skipped segment can be recovered through the use of the backward fast tracks.

(2) Responsibility Hierarchies and Responsibility Tiers.

A second aspect of the solution is to distribute the load for monitoring the status of queries and performing error recovery evenly among all nodes along the ring. In some embodiments, for each query, the nodes are divided into different responsibility tiers and take on a corresponding amount of monitoring and error recovery responsibilities for that query in addition to providing answers to the query. A responsibility hierarchy rule is used to distribute the nodes into different responsibility tiers for different queries, such that on average, over time, the loads on the nodes are evenly distributed; and no particular node or group of nodes are preferentially favored, unless designed to be such due to the different capacities of the nodes. In general, the responsibility hierarchy for one query is different from the responsibility hierarchy of a different query. More details on the responsibility hierarchy rule and responsibility tier will be provided later. Additional constraints on the relationships between the selection of direct contacts and the responsibility tiers of nodes will also be provided later in the specification.

(3) Query Monitoring Based on Query States.

A third aspect of the solution is to set up a set of simple action rules regarding how a node participates in the transmission of queries, collection of answers, dealing with a transmission failure of a query message, recovering answers from skipped nodes, monitoring status of a query, initiating or forwarding acknowledgements for a query, and so on. The set of simple action rules are implemented by all nodes in the ring, and the set of action rules allow the individual actions of each node to coordinate with those of other nodes in a way to provide efficient and robust map-reduce communications in the linear communication orbit.

In some embodiments, the action of each node is based on the status of the query, when the node receives the query for the first time. The node may continue to monitor the query for a period of time depending on its responsibility tier for the query. The continued monitoring is based on additional query messages and acknowledgements received by the node regarding the query. Some nodes may carry the additional responsibilities of aggregating results from multiple parts of the ring, and/or reporting the final results depending on its position and responsibility tier in the ring.

Most frequently, a node may receive a query message for the first time in a normal situation from its upstream neighbor, and is able to forward the query message to its downstream neighbor after adding its own answer to the query message. Sometimes, a node may receive a timeout for a query message that it has answered and attempted to send forward, and thus, try to send the query message to one of its responsive forward contacts in order to skip the non-responsive node(s) present in between. Sometimes, the node may also receive a query message from a backward contact due to a break present in an upstream segment of the node, and may try to send the query message backward to one its responsive backward contacts within the skipped upstream segment to recover answers from as many of the skipped nodes as possible. Sometimes, when the node receives a query message that it had once sent upstream before, and the query message is now accompanied with more answers collected from at least some of the previously skipped upstream nodes, the node can add its own answer and tries to send the query message forward to its nearest downstream neighbor.

In order to keep track of a query's status (e.g., whether it is new, whether it has skipped forward in the unanswered range, whether the skipped section has been recovered, whether it has been fully answered by the reachable nodes within the monitoring range of the node, whether it has been fully answered and the answers need to be report back, whether the query can be sent further forward, whether the query should be sent to another node that can better recover from the transmission failure, etc.), each node that is aware of the query determines the current position of the query relative to the node's own position, and assigns a current state to the query with respect to the node itself. The node updates the state of the query based on its knowledge of the current position of the query as the query is propagated in the ring. The node can learn about the query's current position based on the information carried in the corresponding query messages, as well as information carried in acknowledgements for the query. In accordance with the set of action rules, each node also determines whether to update the current position of the query, whether to create an acknowledgement of a query, and whether to send a self-created or forward a received acknowledgement for a query along the ring, based on the position of the query, the state of the query, and the responsibility tier of the node for the query.

More details on how the configuration and actions rules can be implemented by the nodes in accordance with some embodiments will be provided below.

In order to explain the solution more clearly, a few concepts are set forth first.

(1) Address of a Node.

Each node i in the linear communication orbit has a respective address $P_i$ (e.g., an IP address or identifier), and all nodes in the network are distributed on the linear communication orbit in an ordered sequence determined based on the order of their addresses. There may be a gap between the addresses of adjacent nodes in the linear communication orbit. The address of a node is also denoted as d.

(2) Channel Number of a Node.

Each node i also has a unique channel number $N_i$, which is a bit string that is statistically independent of the address ordering of the nodes in the linear communication orbit. The channel number $N_i$ of each node i may be chosen randomly. Alternatively, in a cryptographically secured system, the channel number of each node may be derived from the public part of a key pair held by the node. Distinct nodes should not have identical channel numbers, and any node's channel number should not be an initial substring of another node's channel number. The maximum length of a channel number should be at least 2*log_2(O), where O is the number of nodes in the network. In order to avoid unacceptable channel number assignments, the system can make nodes with identical channel numbers aware of each other, and make a node whose initial channel number is identical to the initial substring of another node's channel number aware of the problem, such that the node can obtain a more suitable channel number. For example, the node can extend its channel number by adding more bits, or the node can remove itself from the network, choose a different channel number, and re-enter the network.

(3) Channel Number of a Query.

Each query j also has a channel number $Q_j$, which is also a bit string. When assigning channel numbers to queries, the query channel numbers should not favor any prefix (i.e., any patterns of initial bit strings). If all nodes in the network are expected to initiate queries uniformly, an initiating node may assign its own channel number to each query it initiates. This choice may be slightly more efficient at initiating parallel queries. If only one node initiates queries, or if the query initiation is coordinated, query channel numbers may be chosen consecutively, with each query channel number as a binary representation of an integer, with the first bit being the least significant bit. This choice can make use of device resources more uniformly. In some embodiments, query channel numbers may also be chosen randomly. This choice may prevent attacks that might rely on predicting the channel numbers.

(4) Similarity.

The concept of similarity S is used to link several concepts used in the solution. The similarity $S(N_i, N_j)$ between two nodes (with channel numbers $N_i$, and $N_j$) is the length of the longest initial substring on which their channel numbers agree. For example, if $N_i$=0101001, and $N_j$=0101100, the longest common initial substring between the two nodes' channel numbers is 0101, thus, the similarity between the two nodes is $S(N_i, N_j)$=4. Similarly, the similarity $S(Q_i, N_j)$ between a query and a node (with channel numbers $Q_i$ and $N_j$) is the length of the longest initial substring on which their channel numbers agree. For example, if $Q_i$=001100, and $N_j$=01010100, the longest common initial substring between the query and the node's channel numbers is 0, thus, the similarity between the query and the node is $S(Q_i, N_j)$=1. If two channel numbers have no common initial substring, the channel numbers' similarity is 0.

(5) Responsibility Tier of a Node for a Query.

Each node i has a responsibility tier $T_{ij}$ for a given query j. The involvement of a node in the handling of a query is governed by the similarity between the node's channel number and the query's channel number. Thus, the responsibility tier $T_{ij}$ of a give node i for a given query j is equal to $S(N_i, Q_j)$, i.e., the length of the longest common initial substring of their channel numbers. Each node initiating or receiving a query message retains some responsibility for the reliability of the corresponding query until it is informed that the query has reached another node with a channel number having a greater similarity to the query's channel number. In other words, each node initiating or receiving a query message retains some responsibility for a corresponding query until the node can deduce from received query messages and acknowledgements that the query has reached another node with a higher responsibility tier than itself. For each given query, there may be zero, one, or more nodes on each responsibility tier along the linear communication orbit, depending on the actual channel number of the query and the actual channel numbers of the nodes in the orbit. In addition, for each given query, a node may have a neighbor node of a lower responsibility tier, an equal responsibility tier, or a higher responsibility tier, depending on the actual channel number of the query and the actual channel numbers of the nodes in the orbit. In some embodiments, assignment of query channel numbers may be biased, such that certain nodes may be favored to have higher responsibility tiers for a larger number of queries due to their higher capabilities (e.g., speed, etc.).

(6) Neighbor Table of a Node.

Each node has a respective neighbor table. The neighbor table of each node lists, for each exact similarity levels (0, 1, 2, 3, etc.), a closest upstream node and a closest downstream node whose channel numbers are exactly s-similar to the node's channel number. To construct a neighbor table, for each degree of similarity s (s=0, 1, 2, 3, etc.), each node tracks the addresses of the next and the previous (by address) nodes with channel numbers exactly s-similar to its own, these addresses, together with any other contact information needed, form the neighbor table. The linear communication orbit is treated as a ring, i.e., if, for a particular value of s (e.g., s=1), no next s-similar node (e.g., the similarity between the nodes is equal to 1 exactly) is known, the node then treats the first s-similar node (by address) encountered in the linear communication orbit as its next s-similar node.

Figure 2:
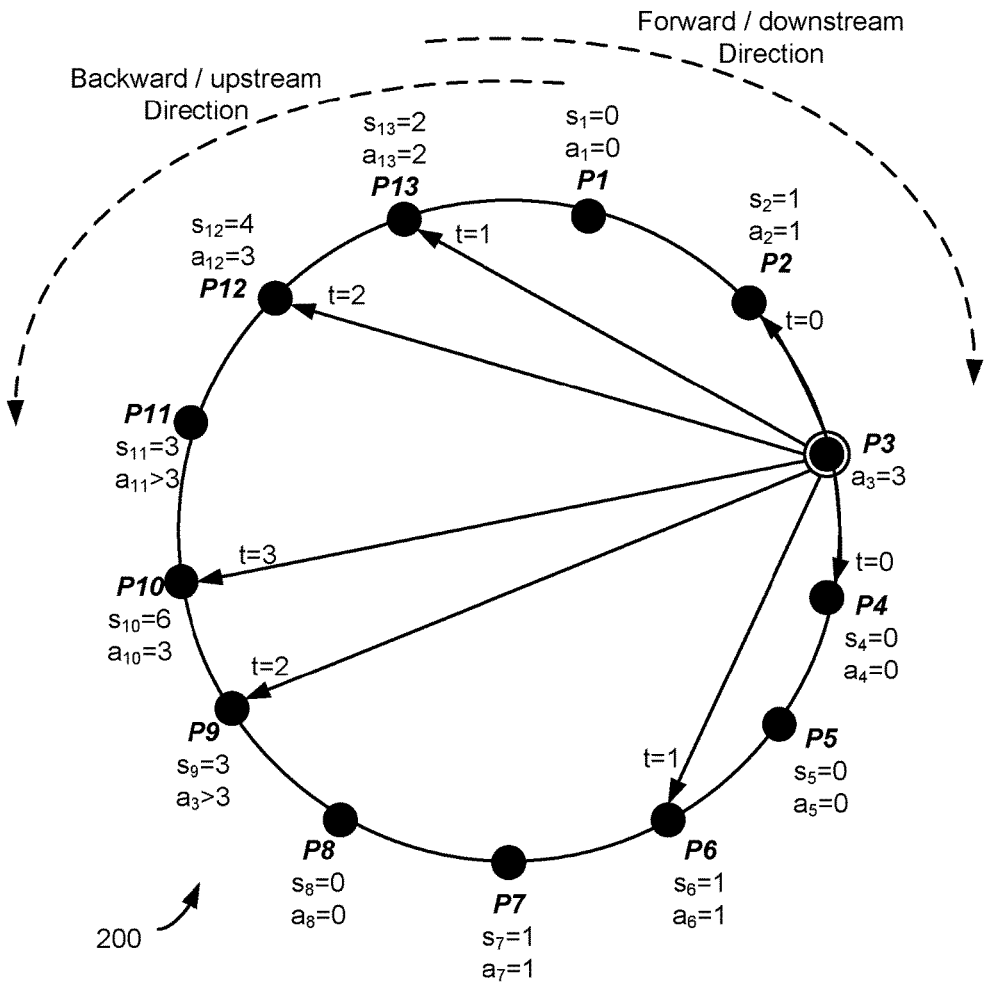
FIG. 2 illustrates an exemplary linear communication orbit and a neighbor table and direct contacts for a particular node in accordance with some embodiments.

Similarly, if, for a particular value of s (e.g., s=3), no previous s-similar (e.g., the similarity between the nodes is equal to 3 exactly) node is known, the node then treats the last s-similar node (by address) encountered in the linear communication orbit as its previous s-similar node. In effect, this forms the s-similar nodes into a ring, with the first node following the last node in the forward or downstream direction. It is to be noted that for sufficiently large values of s (e.g., s greater than log_2(O), O being the total number of nodes in the network), there may be no entry for the s-similar nodes in the neighbor table. Each node maintains its neighbor table up-to-date based on its knowledge of the nodes present in the network. The neighbor table is used by the node to locate its direct contacts in the network to construct its set of fast tracks. FIG. 2 shows an exemplary linear communication orbit 200 with thirteen nodes $P_1$-$P_{13}$ ordered in a sequence. An exemplary neighbor table of the node $P_3$ is shown based on the rules set forth above. The similarity s between each node $P_i$ and $P_3$ is indicated by the value of s next to the node $P_i$. The previous neighbor and next neighbor for each value of s are identified in the neighbor table of $P_3$ shown in FIG. 2.

(7) Fast Tracks and Direct Contacts of a Node.

Each node has a respective set of direct contacts, including a set of forward or downstream direct contacts, and a set of backward or upstream direct contacts. The node identifies its set of direct contacts based on the information stored in its neighbor table. For each degree of similarity t (e.g., t=0, 1, 2, 3, etc.), the node maintains direct contact with the next and the previous at-least-t-similar node listed in the neighbor table. Therefore, if, following the downstream direction of the ring, there is a node that is both further away and less similar than another node, the former node cannot be selected as a direct contact in the forward or downstream direction. Similarly, if, following the upstream direction of the ring, there is a node in the neighbor table that is both further away and less similar than another node, the former node cannot be selected as a direct contact in the backward or upstream direction. FIG. 2 also shows $P_3$'s set of forward contacts and backward contacts formed based on $P_3$'s neighbor table shown in FIG. 2. As can be seen in FIG. 2, for each degree of similarity t (e.g., t=0, 1, 2, 3, etc.), the node has a respective forward contact and a respective backward contact. Each value of t corresponds to a respective forward fast track linking the node to the corresponding forward contact, and a respective backward fast track linking the node to the corresponding backward contact. For the maximum value of t possible for the particular node, the corresponding forward contact and backward contact may be the same node (e.g., $P_{10}$ is both the forward contact and the backward contact of $P_3$ at similarity level t=3). The similarity between a node and its level-t contact is greater or equal to t (i.e., at least t), and there is no other node between the node and its level-t contact that is more similar to the node than the level-t contact. Thus, the direct contacts of each node are distributed along the ring with increasing similarity to the node and with increasing distance away from the node. When sending a query message downstream (e.g., in error discovery mode), the node tries to use the fast tracks from low to high similarity values for t, trying to skip as small a segment as possible to reach a responsive node. Similarly, when sending a query message upstream (e.g., in error recovery mode), the node tries to use the fast tracks from high to low similarity values for t, trying to locate a responsive node from as far back as possible in the skipped segment. In FIG. 2, the respective levels of the direct contacts t (also the level of the corresponding fast track) are indicated by the values of t written next to the corresponding direct contacts and corresponding fast tracks.

(8) Relationships Between Responsibility Tiers and Levels of Direct Contacts.

Based on the definitions of channel numbers (which are bit strings), similarity, responsibility tiers, direct contacts (including levels and locations of direct contacts), the following relationships exist. (i) If $S(a, b)<S(b, c)$, then $S(a, c)=S(a, b)$; (ii) if $S(a, b)=S(b, c)$, then $S(a, c)>S(a, b)$; and (iii) If $S(a, b)>S(b, c)$, then $S(a, c)=S(b, c)$. In other words, the similarity is bounded transitively. As a result, if a node's responsibility tier is $T_{ij}=a_0$, its neighbor at level $a_0$ has a higher responsibility tier than the node. At the same time, if a node has the same responsibility tier as another node for a query, the nodes are more similar to each other, than they are similar to the query. A level-t contact of a node is at least t-similar to the node. In FIG. 2, the responsibility tier of each node is indicated by the value of a written next to the node, assuming that the responsibility tier of $P_3$ is a=3.

The above mentioned concepts of node address P, node channel number N, query channel number Q, similarity S, query-specific node responsibility tier T, node-specific neighbor table (based on exact similarity level s), and node-specific direct contacts (based on minimal similarity level t), form the basis for setting up the network in a way such that subsequent action rules regarding how to handle each map-reduce communication (e.g., messages including question, answer, and/or acknowledgements, etc.) by each node.

The configurations shown in FIG. 2 are from the perspective of a node $P_3$ and a particular query. Other nodes will have different neighbor tables, and direct contacts. For different queries, each node will also have different responsibility tier values than those shown in FIG. 2.

(1) Network Setup Process.

During the network setup process, each node receives its address and inserts itself into the linear communication orbit in accordance with the rules described in the Incorporated Disclosure. The node obtains its channel number, and constructs its neighbor table. In particular, when a node is authoritatively informed of the address of an s-similar device, the node updates its neighbor table if necessary. For example, if the node is informed authoritatively that there is a closer downstream s-similar node in the ring than the one recorded in its neighbor table for similarity value s, the node updates its neighbor table for the next node entry of similarity value s with the address of the newly discovered node. If the node is non-authoritatively informed of the address of an s-similar node that would be entered into its neighbor table, the node sends a message to that node asking for authoritative information. In some embodiments, when providing addresses, a node is considered authoritative for itself, and for nodes that are both less similar and further away along the ring. Consequently, the only authoritative source of information on a direct contact is the direct contact itself. If a node is authoritatively informed of the non-existence (e.g., by exiting from the network) of another node at an address recorded in the neighbor table, the node removes the address from its neighbor table. When a node has not received authoritative information about another node recorded in its neighbor table for a sufficient period of time, that node is deemed lost and is removed from the neighbor table. In some embodiments, the addresses of lost nodes may be retained separately, with contact being attempted from time to time, in order to facilitate recovery from network outages.

In some embodiments, in order to correct the neighbor tables and keep the neighbor tables up-to-date, the nodes in the network periodically exchange information from their neighbor tables with other nodes that they contact directly. This exchange helps to keep nodes from being deemed lost, and drives the neighbor tables toward containing the correct addresses. Viewed over the network as a whole, this exchange reaches a steady state when disjointed portions of the network are organized into coherent rings.

In some embodiments, one or more high-availability devices in the network may be designated as "gathering nodes" and their addresses are made available to all nodes in the network. The addresses of the gathering nodes may be made available directly to each node, or through an outside mechanism such as a server (e.g., a DNS server). In some embodiments, when the network includes multiple disjoint portions, e.g., at start-up or after a network failure, each portion will try to include one or more of the gathering nodes, such that over time, the disjoint portions will be merged together through the exchange of address information made through the gathering nodes. A node (e.g., a new node) that has not yet contacted any other node is a singleton, and is disjoint from other portions of the network. In some embodiments, a singleton node may join other nodes by contacting previously lost nodes or the gathering nodes. In some embodiments, only nodes that find a gathering node address to be between the addresses of the previous and next nodes listed in their neighbor tables need to exchange neighbor tables with the gathering node. This rule implies that only two nodes from each disjoint portion of the network attempt to contact each gathering node, and that no node in the portion already containing the gathering point needs to do so.

As set forth earlier, each node also tries to establish a set of fast tracks by identifying and maintaining connections with a set of direct contacts. The direct contacts are identified in accordance with the current neighbor table, and the neighbor table is updated whenever new address information is received from the current set of direct contacts. Over time, the set of forward contacts and the set of backward contacts for each node also reach a steady state, as the neighbor table of the node reaches a steady state. When the direct contacts of nodes in the network have reached a steady state, map-reduce communications can be propagated and handled in the network in accordance with the action rules set forth below.

(2) Map-Reduce Communications (a) Monitoring Status of a Query by Messages and States.

In general, map-reduce operations are performed by passing query messages around a network, with the goal of combining results from as many nodes as possible. A query message (as opposed to a "query") includes a question part (also referred to as the query part) and an answer part (also referred to as the response part). The question part identifies the map and reduce operations to be performed by the nodes. The question part is identical to all messages involved in the query. The map operation may include making changes to the state of a node, or obtaining certain status information of the node. The reduce operation may be obtaining an aggregation or conclusion based on collected information, or may be trivial (i.e., do nothing). When the reduce operation of a query is trivial, the query becomes a simple broadcast instruction for taking the map operation. In general, the answer part of the query message contains a result of the reduce operation, and a node answers the query by performing the specified map operation, and then combining the existing answer with the new data provided by the node using the specified reduce operation. In some embodiments, multiple query messages with the same question part can be combined into a single query message by copying the shared question part and using the reduce operation to combine the answer parts in the different query messages. For some reduce operations, this can only be done when the answers are from disjoint sets of nodes, such that the answers from some nodes are not counted more than once. As used herein, a "query" generally refers the abstract task that needs to be accomplished in the network, and the task is described in the query messages corresponding to the query. Many query messages may be involved in a query. A query also involves many acknowledgement messages which provides information about the status of the query but may or may not include the question or answer parts.

As set forth earlier, each query is given a respective channel number. The query messages for a given query should include the query's channel number, such that the query can be identified when the query messages corresponding to the query are received by each node, and the node would know its own responsibility tier for the query.

In addition, as set forth earlier, the involvement of a node in the handling of a query is governed by the similarity between the node's channel number and the query's channel number (in other words, the responsibility tier T of the node for the query).

In some embodiments, each node receiving a query message retains some responsibility for the reliability of the query until it is informed that the query has reached another node on a higher responsibility tier downstream or upstream.

(b) Determining the State(s) of a Query.

In order for a node to determine the current state of a query (e.g., whether the query has skipped forward in the ring before being fully answered, whether the query has been answered and reached another node downstream, or whether it needs to be answered now by the node itself, etc.) with respect to the node itself, the node needs to know the range of the orbit in which the query has already been answered (i.e., the "answered range"), and the range of the orbit in which the query has not yet been answered (i.e., the unanswered range). Thus, query messages and acknowledgements for query messages includes three addresses, including the current position p of the query, the beginning position b of the query, and the end position e of the query. The answered range for the query is [b, p), the unanswered range for the query is [p, e]. The current position p of the query is the address of the node that immediately follows the last node in the answered range. The node receiving the query messages or acknowledgements determines the current state for the query with respect to the node itself based on the addresses p, b, e, and the node's own address d. The state of the query tells the node how the query should be handled by the node at any given time when the node receives a query message or acknowledgement regarding the query. The circular arrangement of addresses may lead to ambiguity: an empty range cannot be distinguished from one which contains all addresses. The ambiguity can be resolved by requiring the device initiating the query to be in either the answered or excluded range, and disallowing queries where all addresses are excluded.

The following describes the common set of action rules that each node in the linear communication orbit implements in order to determine how to handle each query under different circumstances. Based on the set of common action rules, the actions of the nodes in the linear communication orbit can be coordinated to provide failure discovery, failure recovery, and regular communications for map-reduce operations in the linear communication orbit.

First, upon receiving or initiating a query, a node i determines its own responsibility tier $T_{ij}$ for the query j. Suppose that the channel number of the node is $N_i$, and the channel number of the query is $Q_j$, the node's responsibility tier for the query is $T_{ij}=S(N_i, Q_j)=a$. For a given value of the responsibility tier a, the node monitors the query passing through 2*(a+1) states. In some embodiments, the states are divided into forward states and backward states, each numbered from 0 to a. For example, if the node's channel number is 010001, and the query's channel number is 010110, the responsibility tier of the node is a=3 (e.g., based on the length of the matching initial substring "010" of the channel numbers). The node will see the query goes through different eight states: −3, −2, −1, −0, +0, +1, +2, +3 in sequence, when the node learns about the query's current positions at different times based on the query messages and acknowledgements the node receives at different times. Some states (e.g., one or more backward states and/or one or more forward states) may be skipped under various circumstances. Once all the states of a query have been gone through (including being skipped) by a node, the node is done with monitoring the query. The exact path that a query travels (up and/or down) along the ring in order to get through all of its states at each particular node does not need to be known or tracked by that particular node; instead, the particular node simply uses the current state of the query with corresponding suitable timeout period(s) to determine if it needs to take any appropriate actions (e.g., actions for responding, reporting, error detection, error recovery, and/or acknowledging) in response to each received query message and/or acknowledgement for the query.

Furthermore, when the node first initiates or receives the query, the node also stores the question and answer parts of the query for further use.

Furthermore, the node associates the current position of the query with a given state based on its neighbor table (or addresses of its set of direct contacts), its own address d, the current position p of the query, the beginning position b of the query, and the end position e of the query. The node updates the state of the query when it learns of the new position p of the query that warrants a state change, until the highest state in the 2*(a+1) has been reached. After that, the node forgets about the query.

The following rules are used by a node with an address d to determine the current state of the query:

(i) If, for some value of t, the device's previous at-least-t-similar neighbor is in both the range [p, e) and the range [p, d], the position is associated with backward state t, for the greatest such value of t. In other words, if the node discovers that it is located within the unanswered range of the query and at least one of its backward contacts is also located within the unanswered range, the node uses its neighbor table to find the farthest direct contact among its set of backward contacts that is within the part of unanswered range between the current position p of the query and its own position in the ring. The level of the farthest contact identified by the node is used as the value for the query's backward state. For example, if there are three backward contacts within the range [p, d], the levels of these three contacts would be 0, 1, 2, respectively, with the level-2 backward contact being the farthest away from the node. Thus, the node associates the query's current position with the backward state "−2";

If no backward state can be assigned to the query, the node performs step (ii) to try to assign the query to a forward state (in other words, the backward states are skipped or passed):

(ii) If, for some value of t, the node's next at-least-t-similar neighbor is in both the range [p, e) and the range [d, e), the position is associated with forward state t, for the smallest such value of t. In other words, if the node discovers that it has at least one forward contact (including its immediate downstream neighbor in the ring) in the unanswered range, the node uses its neighbor table to find the nearest direct contact among its set of forward contacts that is both within the range [p, e) and the range [d, e). The level of the identified nearest forward direct contact is assigned as the value of the forward state for the query. In general, if the current position of the query is at the node itself, the node's nearest forward contact would be its immediate downstream neighbor (with level t=0). If the node successfully passes the query to its immediate downstream neighbor, then the node can update the state of the query to be +0. This is the most common scenario in normal operation. If the node learns that the current position of the query has advanced past the immediate downstream neighbor of the node (e.g., through an acknowledgement message received later on), and reached the level-1 forward contact of the node, then, the node can update the state of the query to be +1;

If no forward state can be assigned to the query, either, the node performs step (iii):

(iii) The node has no state for the current position of the query, and the node sends the query away and forgets it.

(c) Performing Actions Based on a Query's State.

Based on the state that the node puts the query in (note: the state of the query is node-specific), the node performs different actions in accordance with the following action rules:

(i) If the state is a backward state, it means that the node is in the unanswered range, and there are other upstream nodes before the node that have been skipped (e.g., due to a break in a segment proceeding the current node). The backward states are used in descending order (i.e., decreasing absolute values of the state number) for error recovery to collect data from the nodes that have been skipped over. So, when entering a backward state t, the node sends a query message directly to its level-t backward contact, and waits for either a more fully answered query message or a timeout. Note that, the node does not provide its own answer yet, until all the backward states have been exhausted in descending order (e.g., decreasing absolute values of t). Specifically, the node updates the backward states of the query as following:

(i)-(a) While the query is still in one of the backward states, if the node receives a query message for the same query and the current position of the query indicated in the query message is for the same backward state or an earlier state (i.e., a backward state with a greater absolute value than the currently recorded backward state), the newly received query message is deemed redundant, and is ignored;

(i)-(b) If, while the query is still in one of the backward states, the node receives a query message for the same query and the current position of the query indicated in the query message is for a later backward state (i.e., a backward state with a smaller absolute value than the currently recorded backward state), the node updates the state of the query in accordance with the new position of the query. In other words, the node has moved through one or more backward states in descending order (i.e., decreasing absolute backward state values). This occurs when as the query has been answered by at least some of the skipped nodes in the skipped segment before the current node, and has reached a lower-level backward contact of the node in the skipped segment of the ring; and (i)-(c) If the node does not receive any query message with a new position and more answers within a predetermined timeout period for a given backward state, the node determines that the skipped segment preceding the associated backward contact is unreachable and recovery effort for that segment should cease (at least by the node itself). Thus, when the timeout expires, the node moves the query into the next backward state with a reduced absolute backward state value (e.g., from backward state "−2" to backward state "−1"), and sends a query message to the backward contact associated with that next backward state. If all of the backward contacts are exhausted due to timeouts (i.e., the last backward state "−0" has also timed out), the node deems the entire skipped segment unreachable. The node then adds its own answer to the query message, updates the current position of the query to its own address, puts the query into a forward state "+0", and sends the updated query message to its level-0 forward contact (i.e., its immediate downstream neighbor);

(ii) If the state is a forward state, and the node's own address is within the unanswered range of the query, the node answers the query, and updates the current position of the query to the node's own address. In error-free operation, when the query is initiated or first received by the node, the query's current position indicated in the query message is the address of the current node. Thus, the node will answer the query and puts it into forward state +0, and the backward states are skipped.

(iii) If the state is a forward state, and the node's own address is within the answered range of the query, the node uses the forward states in ascending order for error detection. The node watches for acknowledgement messages or query messages that indicate a partial failure in the forward direction. When a node puts the query into a forward state tin response to a query message with a new position of the query or a timeout for a previously entered forward state, the node sends the query to the next at-least-t-similar neighbor (e.g., the level-t forward contact), and waits for either an acknowledgement, a more fully answered query message, or a timeout. Specifically, the node updates the state of the query as follows:

(iii)-(a) When the node enters a forward state in response to an acknowledgement, the node only updates the state of the query according to the new position of the query recorded in the acknowledgement. In other words, if the acknowledgement indicates a new position of the query corresponding to a higher numbered forward state, the node updates the state of the query accordingly. If the acknowledgement includes a new position that corresponds to the same forward state or a lower forward state as the currently recorded state for the query, the node treats the acknowledgement message as redundant and ignores it. The node does not send out any new query message in response to the acknowledgement and simply waits for more acknowledgements, a more fully answered query message, or a timeout for the new forward state. In the general case, an acknowledgement will move the query to the next forward state with an increased absolute forward state value. But if an acknowledgement is lost, or if the next forward contact of the node has a greater similarity to the query than to the node, the node may skip one or more forward states. In some embodiments, the acknowledgement message may include an updated answer part, and the node does not change the address range of the stored message in response to an acknowledgement unless the acknowledgement includes an updated answer part. If the above rule finds no higher forward state for the query, the node is done with the query, and stops further monitoring of the query's state. Normally, when the node is done with the query, the query has traveled beyond the node's responsibility range to another node downstream or upstream, and the node simply forgets about the query and does not send out any further messages for the query. In some situations, the node is done with the query due to timeout or partial failure of the query traveling forward, in such cases, the node may send out a final query or report message. More details on how the node handles such situations will be provided in more detail later in the specification.

(iii)-(b) If the node receives a query message and the query message indicates a partial failure of the query to travel forward, the node can choose to ignore the query message or to update the state of the query. If the current position of the query indicated in the query message corresponds to a backward state, a lower-numbered forward state, or the same forward state recorded for the query by the node, the query message is deemed late or redundant, and the node ignores the query message. If the current position of the query indicated in the query message corresponds to a higher-numbered forward state, the node records the new answer part and the new address range of the query, and puts the query into the new forward state. The node then sends a new query message for the query to the forward contact corresponding to the new forward state. This can happen when there are more than one breaks in the responsibility range of the node, and when the query fails to travel forward after answers from some of the nodes have been collected and sent back from a forward contact, the node can try to reach the next forward contact to skip ahead even further.

(iii)-(c) If the node receives a timeout for a current forward state of the query, the node moves the query into the next higher forward state. If there is no further forward state (i.e., all the forward states within the node's responsibility range have been exhausted), the node is done with the query. In some embodiments, if the highest numbered forward state times out, or is ended by a returned query message, the node sends the query message backward toward a neighbor node that has a higher responsibility tier than the node itself (i.e., to a node with a better matching channel number to the query). This allows the node on the higher responsibility tier to attempt to recover from the problem, because the node on the higher responsibility tier has a wider responsibility range and may help skip over the problematic segment that the current node was not able to pass.

(iv) If the node is done with the query because the unanswered range is empty, e.g., when the query has reached the end of the range in which answers are requested, the node sends the query message forward to another node that has a higher responsibility tier than itself (i.e., a node with a better matching channel number to the query). This allows the better matching node to send out final acknowledgements, consolidate results from different portions of the query executed in parallel (e.g., due to query splitting to be described later in the specification), and deliver the results of the query. When the node is done with the query, and there is no better-matching node listed in its neighbor table, the node itself is responsible for reporting the results of the query to its final destination (e.g., the initiating node of the query). In other words, the small number of nodes that have the highest responsibility tier for the query are responsible for delivering the results of the query to its destination.

The above describes how a node updates the state of a query based on query messages, acknowledgements, and timeouts related to the query, and the query's current state. Failure detection and failure recovery, as well as normal map-reduce communications, are automatically accomplished through the collective effect of the individual actions of the nodes along the ring based on the set of rules above. As set forth above, in order for the node to know the state of the query, the node needs to obtain the new positions of the query from query messages and acknowledgement messages the node has received for the query. In addition, in order for the node to be done with a query, the node needs to know whether the query has reached another node that is on a higher responsibility tier than itself.

(c) Sending Acknowledgement Messages for a Query.

The following rules describe how acknowledgements are prepared and sent out or forwarded by the nodes in the ring:

Acknowledgement messages for a query identify the query by its channel number. Each acknowledgement message contains an updated current position of the query, and a similarity level. Acknowledgement messages are not sent to nodes in the unanswered range. If the node is a tier-0 node for a query, the node does not initiate any acknowledgement for the query. If the node is a tier-a node for the query, the node initiates the acknowledgements for all similarity levels less than a. The node sends the acknowledgement with similarity t to the level-t backward contact, if that level-t backward contact is in the answered range.

Acknowledgement messages marked with similarity level t are sent only to nodes that have responsibility tiers greater than or equal to t. If the receiving node of an acknowledgement with similarity t is a tier-t node for the query, the receiving node forwards the acknowledgement to its level-t backward contact, which necessarily has a responsibility tier greater than or equal to t. If the receiving node of an acknowledgement with similarity level t has a responsibility tier greater than t, the receiving node does not forward the acknowledgement (since the receiving node already provided or will provide an acknowledgement for all similarity levels less than its own responsibility tier).

In some embodiments, it is possible for acknowledgement messages to carry an updated answer section, avoiding data loss in come complex failure scenarios. In some embodiments, it is also possible, particularly when acknowledgements do not carry answer information, to delay initiating acknowledgements in order to combine many acknowledgements into a single message. This lengthens the necessary timeouts, but reduces acknowledgement traffic at times of high load.

(d) Determining a Timeout for a Current State of a Query.

As set forth above, a node will update a query's state based on a predetermined timeout associated with that state. In some embodiments, timeouts for the various states are set by measuring the round-trip latencies between nodes, and adding the results along the worse-case paths for messages. For example, in some embodiments, when the node-to-node latencies are equal, the timeouts are expected to be roughly proportional to $2^s$, where s is the state number. In some embodiments, the round-trip latencies can be measured by including timing information in acknowledgement messages.

(e) Additional Variations.

The above are some aspects of the solution to provide robust map-reduce communications in a linear communication orbit. In some embodiments, additional variations may be implemented to further improve the efficiency and robustness of the system. In some embodiments, when the results of the query are large, nodes that are more similar to the query's channel number (i.e., nodes having the higher responsibility tiers) may transit much of the result data directly to each other to reduce network traffic. In some embodiments, when the results of the query are sensitive, nodes that have higher responsibility tiers may encrypt the results from the nodes having lower responsibility tiers for the query, thus limiting the exposure of the sensitive data.

In some embodiments, nodes that have the highest responsibility tiers for a query may also maintain a balance between running the query sequentially (which reduces resource usage) or in parallel (which reduces latency). In some embodiments, upon first receiving a query, a node with a responsibility tier greater than zero for the query may choose to split the query, so that the query will be performed in parallel rather than sequentially.

In some embodiments, the decision regarding whether to split a query is based on a comparison of the urgency of the query (e.g., expressed as an expected completion time for the query in the query message) to the time expected for handling the query sequentially. To split a query, the node splitting the query sends a query message containing the same question part, an empty answer section, and modified beginning and end addresses to its most distant contact in the unanswered range. This action splits the unanswered range at the node's most distant direct contact, such that the query can be performed in the two segments of the unanswered range in parallel. For example, if the addresses in the received query message is [b, p, e), then, the split query message is sent to a contact at address n, the split query message carrying the addresses [n, n, e). After sending the split query message, the node waits for an acknowledgement message or a timeout for the split query message. If an acknowledgement message is received for the split query message, the node replaces the addresses in the original received query message with addresses [b, p, n), where n is the address of the direct contact to which the split query message was sent. If the timeout expires, the split was unsuccessful, and the node processes the query message as usual in the original address range.

In some embodiments, if the query split was successful, and the new query message would still take too much time to complete, the node may choose to split the new query message again in the manner described above (but with the new unanswered range and a new distant contact within that new unanswered range). If the query split is not successful, the node processes the new query message sequentially in the normal manner.

Figure 3:
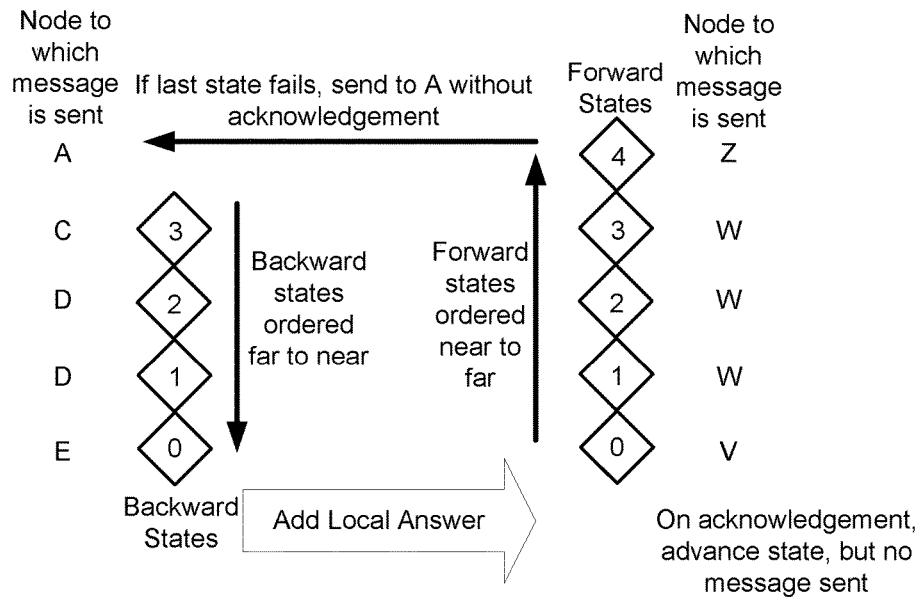
FIG. 3 illustrates an exemplary linear communication orbit and propagation of a query from the perspective of a particular node in accordance with some embodiments.
Figure 3:
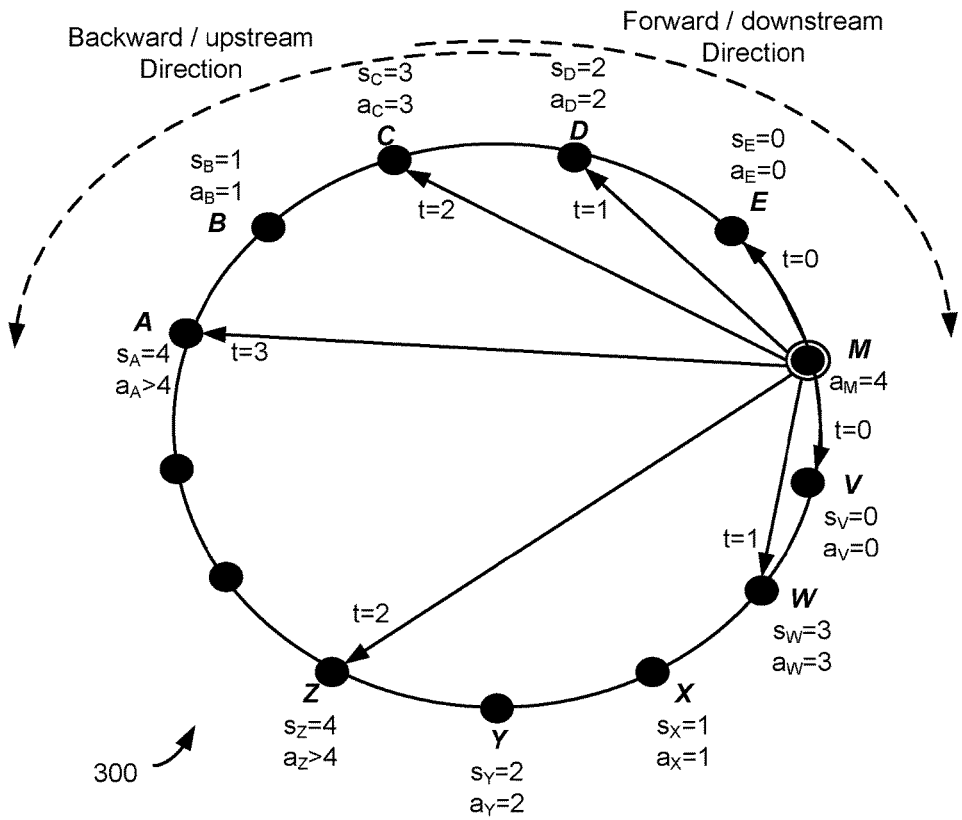

FIG. 3 illustrates a few more concrete examples of how a query passes through all of its possible states at a node having a responsibility tier a=4. As shown in FIG. 3, the linear communication orbit 300 is linked into a ring. The address range of the query can start anywhere in the ring and end anywhere downstream in the ring. The orbit 300 includes a segment in which a node M having a responsibility tier a=4 is surrounded by a series of upstream nodes (A, B, C, D, E) in the order of increasing distance from node M, and a series of downstream nodes (V, W, X, Y, Z) in the order of increasing distance from node M. Among the surrounding nodes, node M has identified a set of four backward or upstream contacts (E, D, C, A) in the order of increasing distance from node M, and a set of three forward or downstream contacts (V, W, Z) in the order of increasing distance from node M. The respective responsibility tiers of all the nodes are indicated by the value of a written next to each of the nodes. The levels of the direct contacts are indicated by the value of t written next to the corresponding fast track for each of the direct contacts. The similarity between node M and each of the surrounding nodes are indicated by the values of s written next to the surrounding node.

In this network configuration, depending on the actual availability of different nodes and the conditions of the network connections at different times during the query's travel around the ring, node M may encounter many different scenarios. For each of these scenarios, node M plays its part in accordance with the set of common action rules set forth above, so that it will respond appropriately to help the query be propagated to and answered by as many available nodes as possible. The following describe but a few example scenarios to illustrate the actions taken by the node M in accordance with the set of common action rules. It should be appreciated that each of the other nodes in the network follows the same set of common action rules as well, and would respond to the situations from its own perspective accordingly. The de-centralized individual actions of the nodes work together to ensure that the query is propagated and answered as completely as possible despite of various kinds of errors being present in the network.

In one most likely scenario (e.g., when the network is error free), when node M receives a query message for the query for the first time, the query message most likely came from node E, its immediate upstream neighbor. In this scenario, node E is the last node in the answered range. When node M receives the query message, it puts the query into forward state "+0", and sends acknowledgements directly to nodes E, D, and C (but not yet to node A). Backward states are all skipped. Node M adds its own answer to the query message, and sends it to node V, its immediate downstream neighbor. Assuming there are no future errors ahead in the ring, node M will receive acknowledgements from node W through node V, directly from node W, from node Z through node W, and directly from node Z. In response to these acknowledgements, node M will update the state of the query from "+0" to "+4" one step at a time or skipping one or more states in between. Eventually, when either acknowledgement initiated by node Z arrives at node M, M forwards the acknowledgement to node A. At this point, the query has gone through all possible states at node M, and node M is done with the query.

In another example scenario, suppose that the query message from node E to node M went astray (e.g. when node M was temporarily unavailable when the query message was sent to node M from node E for the first time). In this scenario, unbeknownst to node M, node E would time out waiting for an acknowledgement from node M and would send the query message backward to node D with its answer. Node D will try to send the query message to node M, and if node M is now available, node M receives the query message indicating that node E was the last node in the answered range. When node M receives the query message, it sends acknowledgements to nodes E, D, and C. Backward states are all skipped. Node M adds its own answer to the query message, and sends it to node V, its immediate downstream neighbor. This scenario may then proceed as in the last example described above.

In yet another example scenario, suppose that node E never delivered its answer to either node M or node D (e.g., in the case that the query message from node D was never received by node E, or in the case that the query message from node E to node D and the query message from node E to node M were both lost). In such a scenario, node E is in the unanswered range, and when node D times out the query message sent to node E, node D sends the query message to node M instead. In this case, when node M receives the query message from node D, it determines that node E is in the unanswered range. Node M sends acknowledgements to nodes D and C, sends the query message to node E, and puts the query into backward state "−0". If node M gets a reply from node E before the timeout period expires, node M updates the state of the query to forward state "+0". Node M adds its own answer to the query message, and sends it to node V, its immediate downstream neighbor. This scenario may then proceed as in the examples described above.

In another more complex example scenario, suppose that all messages to node C have failed due to various errors. When the query message from node B to node C has timed out of its "+0" and "+1" states, node B sends the query message back to node A. Node A will try to send the query message to node C directly, but fails as well. As a result, the query times out of its forward states "+2" and "+3" at node A. Node A then tries to send the query message to node M. If node M is able to receive the query message from node A, node M will determine that the last node in the unanswered range for the query is node B. Node M identifies its farthest backward contact node C in the unanswered range, and sends the query message to node C and puts the query into backward state "−3". If backward state "−3" times out at node M, node M would try to send the query to the next farthest backward contact node D and puts the query into backward state "−2". If node D is able to receive the query message from node M, node D will also try to send the query message to node C. Because node C is unresponsive, the query will time out of its backward states "−2", "−1", and "−0" at node D. At this point, node D will send the query message to node E, node E will send the query message to node M, each node adding its own answer to the query message before sending it to the next node. When node M receives the query message from node E, it determines that the last node in the answered range is node E. As a result, node M puts the query into forward state "+0", skipping the "−1" and "−0" states. Node M adds its own answer to the query message, and sends it to node V, its immediate downstream neighbor. This scenario may then proceed as in the examples described above.

If in the last example scenario, node M was able to send the query message to its farthest backward contact node C in the unanswered range, the most likely path of the query would be M→C→D→E→M. In such a case, when node M receives the query message, it will put the query from backward state "−3" directly into forward state "+0", skipping the backward states "−2", "−1" and "−0".

In yet another example scenario where earlier errors and unavailability of nodes has caused a failure of messages to reach beyond node B, Node A has to send the query message to node M directly. When node M receives the query message from the upstream node A (e.g., a node in the answered range) for the first time, node M calculates the state of the query, and decides to put it into backward state "−3", because node C is the farthest backward contact it has within the unanswered range, and the similarity between node C and node M is at least 3. The backward state "−4" is skipped. In the event that the query message is returned from node C with an answer collected from node C, the current position of the query indicates that node C is now in the answered range. Based on the new current position of the query, node M updates the state of the query to backward state "−2", because node D is now the farthest backward contact in the unanswered range, and the similarity between node D and node M is at least 2. In the event that the query message is returned from node D with an answer collected from node D, the current position of the query indicates that node D is now in the answered range. Based on the new current position of the query, node M updates the state of the query to backward state "−0" (skipping backward state "−1"), because node E is now the farthest backward contact in the unanswered range, and the similarity between node E and node M is at least 0. Node M now adds its own answer to the query message, and updates the state of the query to forward state "+0" because the nearest forward contact in the unanswered range is node V, and the similarity between node M and node V is at least 0.

After the query message has left node M and arrived at node V, node V adds its own answer to the query message and sends it forward to node W. Since node V is a tier-0 node for the query, node V does not provide any acknowledgement for the query message into the answered range. When the query message reaches node W, node W adds its own answer to the query message. W is has a responsibility tier of 3 for the query, and initiates the acknowledgements for levels 0, 1, and 2. The acknowledge message for level 0 is forwarded upstream by node V and arrives at node M. Node M updates the state of the query from "+0" to "+1" upon receipt of the level 0 acknowledgement from node V, if acknowledgements for higher levels have not already been received from other downstream contacts. The acknowledgement for levels 1 and 2 are received directly from node W by node M. Node M updates the state of the query to "+3", skipping one or more forward states (e.g., "1", "2" or both) depending on the current forward state value of the query at node M. When the query message travels to node Z, node Z adds its own answer to the query message and updates the current location of the query to the address of its downstream neighbor. Node Z provides an acknowledgement with a similarity level of at least 4 because node Z has a responsibility tier of at least 5. These acknowledgements arrive at node M either directly or through node W. Based on the similarity level in the acknowledgements initiated by node Z, node M determines that forward states "+3" and "+4" have been passed, and node M finds no more further states to enter. As a result, Node M forgets about the query. In a different scenario, if for some reason a state times out, node M will move to the next state, and send the query message to the node associated with the next state as indicated in FIG. 3. If the last forward state is not acknowledged before it times out, node M sends the query message with all of its answers to node A in the answered range, such that node A can try to reach a responsive node beyond node Z.

With respect to the way that acknowledgements are initiated and forwarded in the above examples, a node receiving a query initiates acknowledgements for each state level lower than the nodes' own responsibility tier, and forwards acknowledgements for the state level equal to the node's own responsibility tier. So, in the above examples, node V (a tier-0 node) initiates no acknowledgement; node W (a tier-3 node) initiates acknowledgements at levels 0, 1, and 2. The level-0 acknowledgement is sent from node W to node V, and node V forwards it to node M. The level-1 and level-2 acknowledgements may be combined into a single acknowledgement and sent to node M directly from node W. Node Z (a node above tier-4) will initiate the acknowledgements for at least levels 0, 1, 2, 3, and 4. Node Z will send its acknowledgments for levels 0-2 to node Y directly, send its acknowledgement for level-3 to node W directly, and send its acknowledgement for level 4 directly to node M. Node Z may also initiate acknowledgements for level-5 and possibly higher levels and send them to node A. The levels 0-1 acknowledgements are stopped at node Y, but node Y forwards the level-2 acknowledgement initiated by node Z to node W. Node W stops the level-2 acknowledgement initiated by node Z and received from node Y, but forwards the level-3 acknowledgement initiated by node Z and received directly from node Z. From node M's perspective, five acknowledgements are expected—one for each forward state. Acknowledgement for level-0 is expected to come from node V, initiated by node W; acknowledgement for level-1 and level-2 are expected to come from node W, initiated by node W; acknowledgement for level-3 is expected to come from node W, initiated by node Z; and acknowledgement for level-4 is expected to come from node Z, initiated by node Z. Likewise, node M initiates acknowledgements at level-0 to node C, at level-1 and level-2 to node D, and at level-3 to node C. In addition, node M also forwards to node A the acknowledgement at level-4 that was initiated by node Z.

The above example scenarios and actions are merely illustrative, and many different scenarios and action patterns may exist given an actual state of the network at the time of a query. Regardless of the actual path of the query messages and the exact actions of the nodes in the ring, the path and actions are the outcome of the nodes responding to their individual local circumstances in accordance with the set of common action rules set forth in this specification.

Figure 4A:
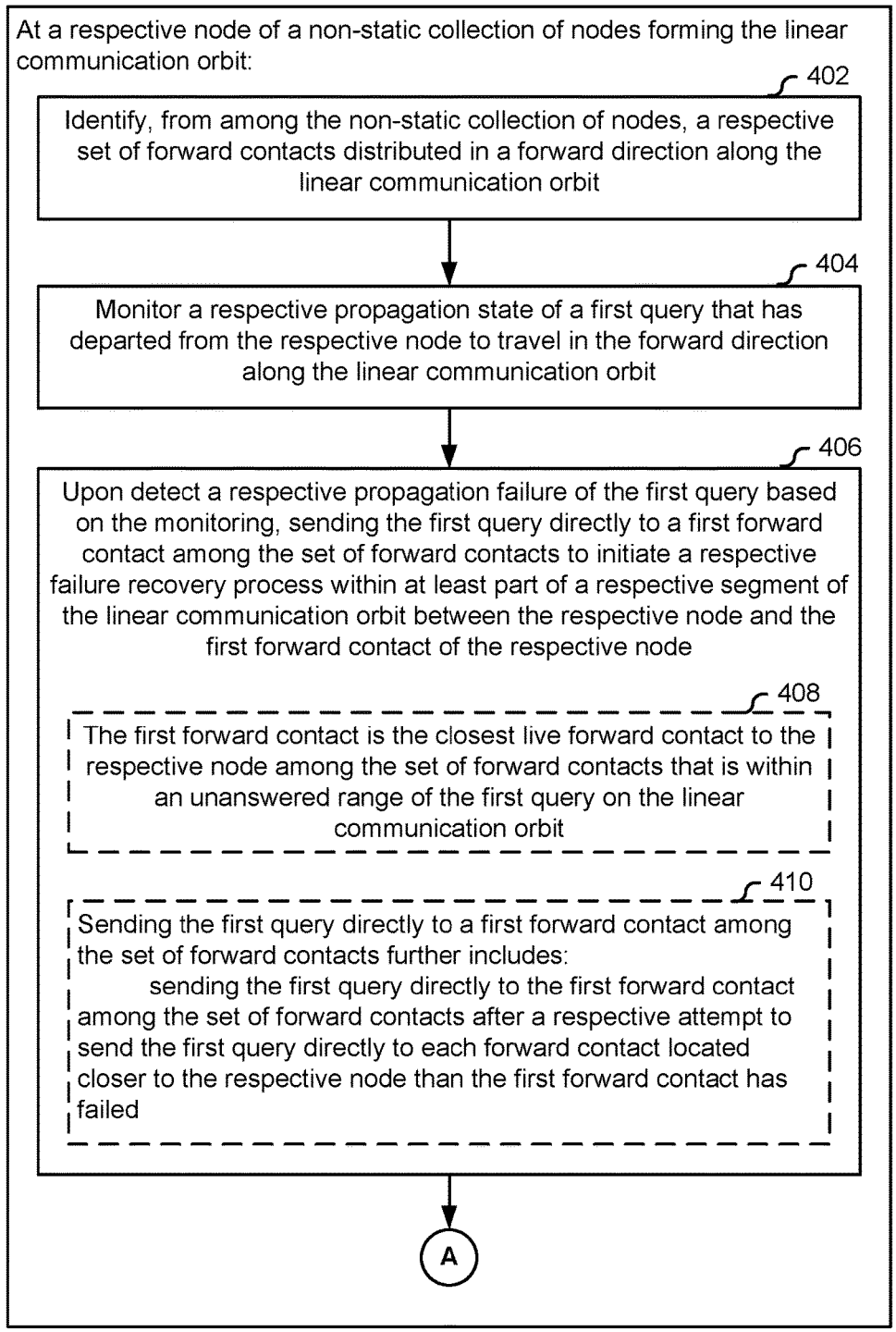
Figure 4C:
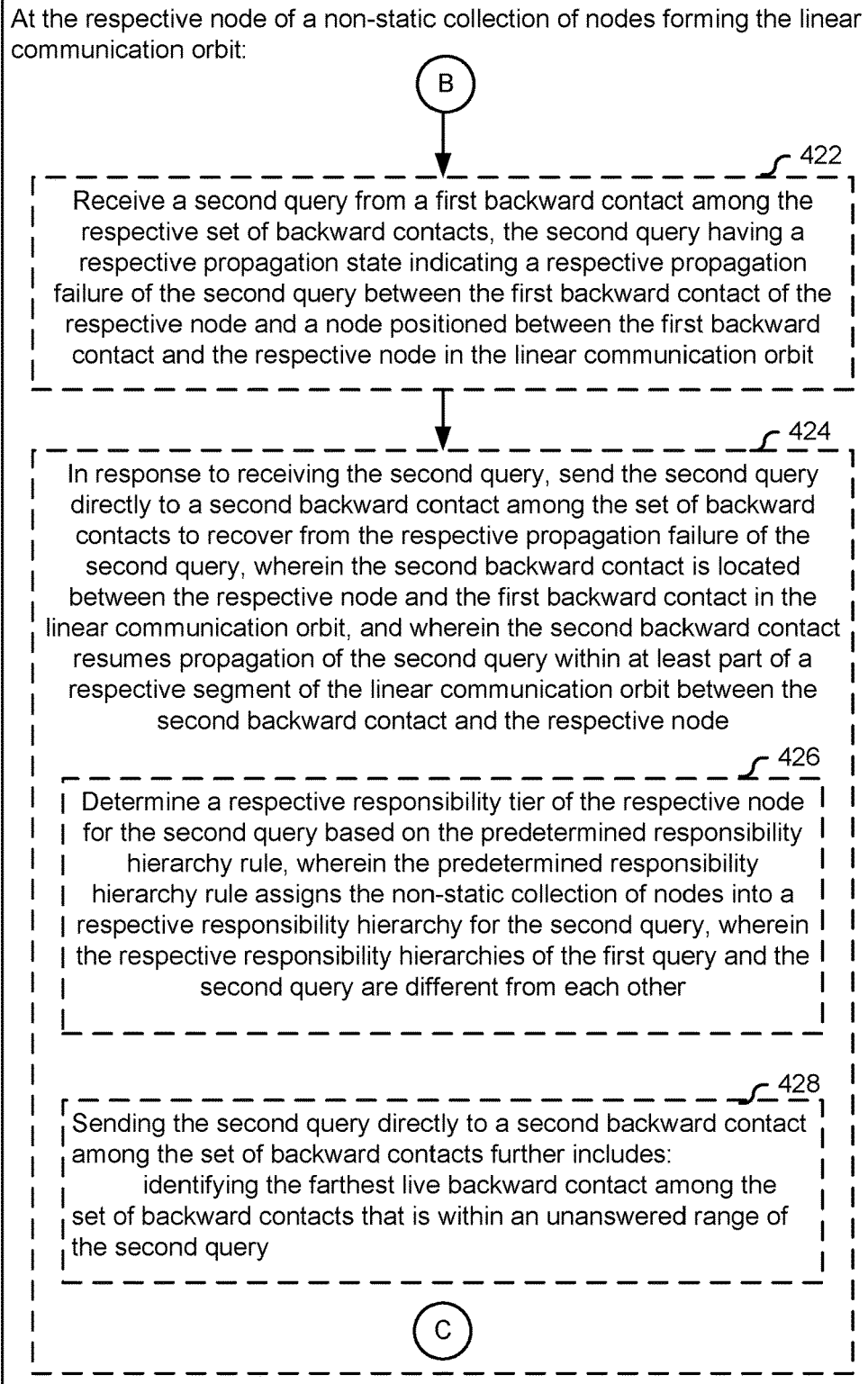
Figure 4E:
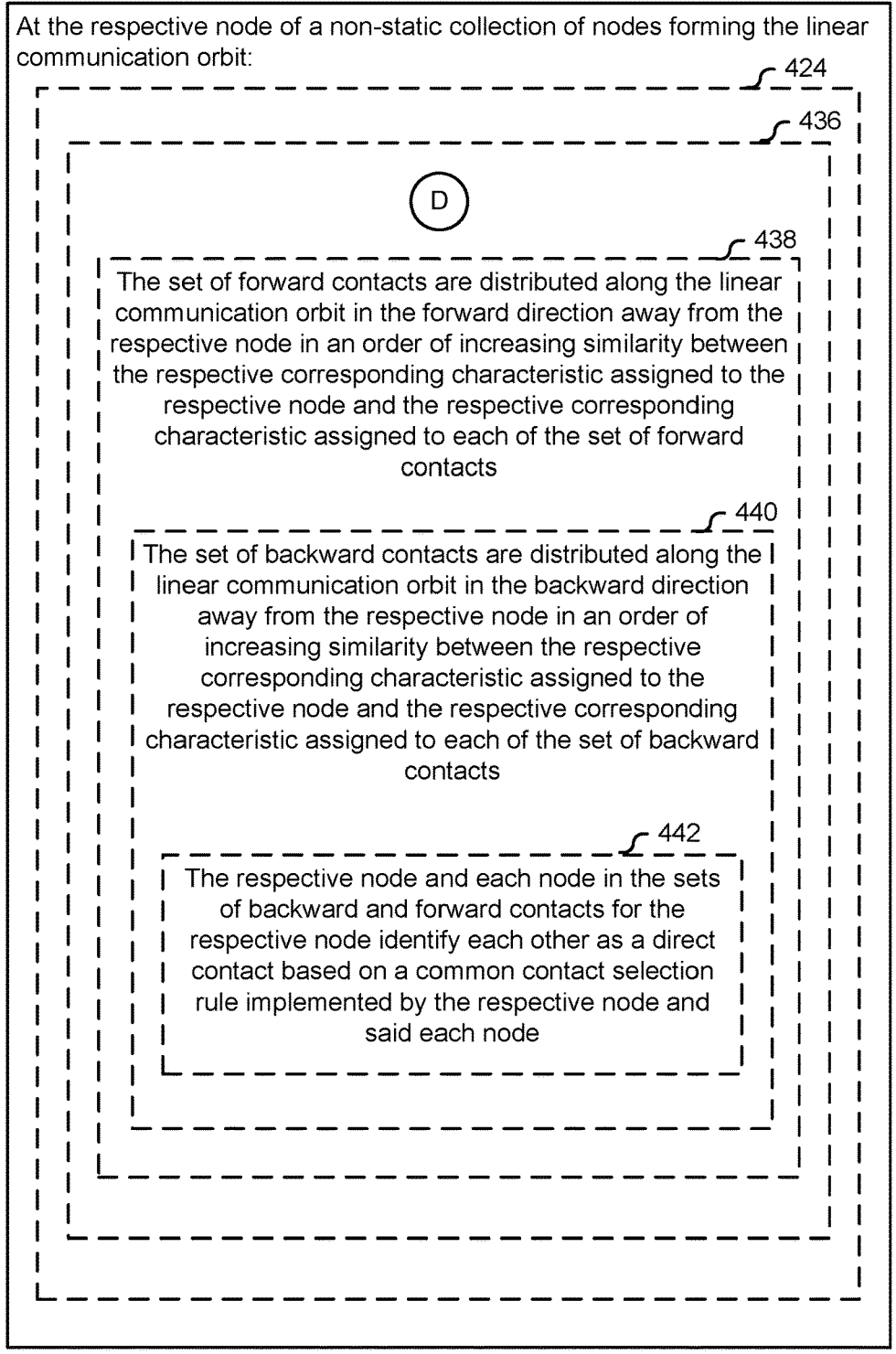

FIG. 4 is a flow chat of an exemplary method 400 for providing map-reduce communications in accordance with some embodiments. The method includes one or more aspects described above, and may be combined with one or more other aspects described above in various embodiments.

In some embodiments, the method is performed by a node (e.g., any node) in the linear communication orbit. The method is described from the perspective of the node in handling one or more queries that is propagated in the linear communication orbit in accordance with the configuration and action rules set forth above.

In some embodiments, to provide message communications with failure detection and recovery in a linear communication orbit, at a respective node of a non-static collection of nodes forming the linear communication orbit, the node identifies (402) from among the non-static collection of nodes, a respective set of forward contacts distributed in a forward direction along the linear communication orbit. The node monitors (404) a respective propagation state of a first query that has departed from the respective node to travel in the forward direction along the linear communication orbit, and upon detecting a respective propagation failure of the first query based on the monitoring, the node sends (406) the first query directly to a first forward contact among the set of forward contacts to initiate a respective failure recovery process within at least part of a respective segment of the linear communication orbit between the respective node and the first forward contact of the respective node. For example, a node can identify its set of forward contacts in the manner described above using the node's neighbor table. The node can monitor a respective propagation state of the first query by establishing a state for the first query after the node receives a query message for the first query in the manner described above, and continue to update the state of the query based on query messages, timeouts, and acknowledgement messages subsequently received for the query. The node can detect a respective propagation failure of the first query based on the failure to receive an acknowledgement of a current forward state of the query within a predetermined timeout period associated with the current forward state. When the node detects such a propagation failure, the node can try to skip forward to reach a forward contact that is located farther away than the forward contact associated with the current forward state, such that any point of failure present in the downstream segment between the node and the farther forward contact can be skipped over. When the farther forward contact receives the query from the node, it will try to send the query backward into the skipped segment such that answers to the query may be collected from at least some of the skipped nodes in the skipped segment.

In some embodiments, the first forward contact is (408) the closest live forward contact to the respective node among the set of forward contacts that is within an unanswered range of the first query on the linear communication orbit.

In some embodiments, when sending the first query directly to the first forward contact among the set of forward contacts, the node sends (410) the first query directly to the first forward contact among the set of forward contacts after a respective attempt to send the first query directly to each forward contact located closer to the respective node than the first forward contact has failed. For example, the node puts the first query in the forward states in ascending order, and after the node puts the query into each forward state, the node first tries to send the query message for the first query to the forward contact corresponding to the current forward state. When there is no acknowledgement for the query message from the corresponding forward contact within the timeout period associated with the current forward state, the node moves the query into the next higher forward state, and tries to send the query message to the forward contact corresponding to the next higher forward state. According to the design of the forward contacts, the forward contact corresponding to the next higher forward state is always located farther away from the forward contact corresponding to the previous (and lower) forward state.

In some embodiments, the node determines (412) a respective responsibility tier of the respective node for the first query based on a predetermined responsibility hierarchy rule, wherein the predetermined responsibility hierarchy rule assigns the non-static collection of nodes into a respective responsibility hierarchy for the first query. The node also determines (414) whether the first query has reached beyond a respective responsibility range of the respective node for the first query based on the respective responsibility tier of the respective node for the first query. For example, the node determines that it is done monitoring the first query when the node has received an acknowledgement or query message that indicates that the first query has reached another node with an equal or higher responsibility tier than the node itself.

In some embodiments, when monitoring the respective propagation state of the first query, the node puts (416) the first query into at least one of a series of forward states corresponding to the responsibility tier of the respective node for the first query based on a new known position of the first query in the linear communication orbit. In some embodiments, when monitoring the respective propagation state of the first query, the node puts (418) the first query into at least one of a series of forward states corresponding to the responsibility tier of the respective node for the first query based on a failure to receive an acknowledgement associated with a lower forward state than the at least one forward state within a predetermined timeout period.

In some embodiments, the node identifies (420), from among the non-static collection of nodes, a respective set of backward contacts in a backward direction along the linear communication orbit. The node receives (422) a second query from a first backward contact among the respective set of backward contacts, the second query having a respective propagation state indicating a respective propagation failure of the second query between the first backward contact of the respective node and a node positioned between the first backward contact and the respective node in the linear communication orbit. In response to receiving the second query, the node sends (424) the second query directly to a second backward contact among the set of backward contacts to recover from the respective propagation failure of the second query, where the second backward contact is located between the respective node and the first backward contact in the linear communication orbit, and where the second backward contact resumes propagation of the second query within at least part of a respective segment of the linear communication orbit between the second backward contact and the respective node. For example, in some embodiments, each node not only has a set of forward contacts for skipping forward in light of a propagation failure in the forward direction, each node also has a set of backward contacts for skipping backward in a skipped segment of the linear communication orbit to reach at least some of the nodes in the skipped segment to collect answers from them.

In some embodiments, the node determines (426) a respective responsibility tier of the respective node for the second query based on the predetermined responsibility hierarchy rule, wherein the predetermined responsibility hierarchy rule assigns the non-static collection of nodes into a respective responsibility hierarchy for the second query, wherein the respective responsibility hierarchies of the first query and the second query are different from each other. As described earlier in the specification, in some embodiments, the predetermined responsibility hierarchy rule may be used to produce different responsibility hierarchies for different queries (e.g., the first query and the second query) because the channel numbers of the queries match the channel numbers of different nodes differently, and as a result, the different nodes may be put into different responsibility tiers of the responsibility hierarchies. This ensures that over time, and on average, the load on each node is roughly equal when a large number of queries have been processed in the network.

In some embodiments, when sending the second query directly to a second backward contact among the set of backward contacts, the node identifies (428) the farthest live backward contact among the set of backward contacts that is within an unanswered range of the second query.

In some embodiments, when sending the second query directly to a second backward contact among the set of backward contacts, the node sends (430) the second query directly to the farthest live backward contact among the set of backward contacts after a respective attempt to send the second query directly to each backward contact located farther away from the respective node than said farthest live backward contact has failed. As described earlier, the node tries the backward states in descending order (i.e., with decreasing absolute backward state values). So the node tries to reach the backward contact that corresponds to the highest backward state (e.g., corresponding to the most negative backward state value) first, and when the backward state is not reachable, the node tries to reach the backward contact corresponding to the next higher backward state (e.g., corresponding to the next most negative backward state value). By the design of the backward contacts, descending backward states correspond to backward contacts that are located increasingly close to the node.

In some embodiments, the node puts (432) the second query into at least one of a series of backward states corresponding to the respective responsibility tier of the respective node for the second query based on a new known position of the second query within the respective segment of the linear communication orbit between the second backward contact and the respective node. For example, if the node receives the query message for the second query with more answers and an updated position of the second query closer than the farthest live backward contact to which the node had previously sent the query message, then, the node moves the query from the backward state corresponding to the farthest live backward contact to the next backward state with a reduced absolute backward state value.

In some embodiments, the node puts (434) the second query into at least one of a series of backward states corresponding to the respective responsibility tier of the respective node for the second query based on a failure to receive more answers for the second query for the respective segment of the linear communication orbit between the second backward contact and the respective node within a predetermined timeout period. For example, if the node does not receive the query message for the second query with more answers and an updated position of the second query closer than the backward contact corresponding to the current backward state within a corresponding timeout period associated with the current backward state, then, the node moves the query from the current backward state to the next backward state with a reduced absolute backward state value, and tries to send the query message to the backward contact corresponding to said next backward state with the reduced absolute backward state value.

In some embodiments, the respective predetermined responsibility hierarchy rule assigns (436) the non-static collection of nodes into the respective responsibility hierarchy for the first query based on a similarity between a predetermined characteristic of the first query and a respective corresponding characteristic assigned to each node of the non-static collection of nodes. For example, as set forth earlier in the specification, the predetermined characteristic can be a channel number for the first query, the corresponding characteristic can be the channel numbers for the nodes, and the predetermined responsibility hierarchy rule assigns the node into different responsibility tiers based on the similarity between the channel number of the first query and the channel numbers of each of the nodes in the network.

In some embodiments, the set of forward contacts are (438) distributed along the linear communication orbit in the forward direction away from the respective node in an order of increasing similarity between the respective corresponding characteristic assigned to the respective node and the respective corresponding characteristic assigned to each of the set of forward contacts. In some embodiments, the set of backward contacts are (440) distributed along the linear communication orbit in the backward direction away from the respective node in an order of increasing similarity between the respective corresponding characteristic assigned to the respective node and the respective corresponding characteristic assigned to each of the set of backward contacts.

In some embodiments, the respective node and each node in the sets of backward and forward contacts for the respective node identify (442) each other as a direct contact based on a common contact selection rule implemented by the respective node and said each node. For example, in some embodiments, the contact selection rule is based on the similarity between the node's channel number and the channel number of each of the node's neighbors in the node's neighbor table, as well as the relative positions of the nodes. More details on how the respective node can select its contacts are set forth earlier in the specification.

Other details and variations of the method 400 are provided earlier in the specification. Various combinations of the features described in the specification are possible and are apparent to person of ordinary skills in the art in light of the disclosure provided herein.

Figure 5:
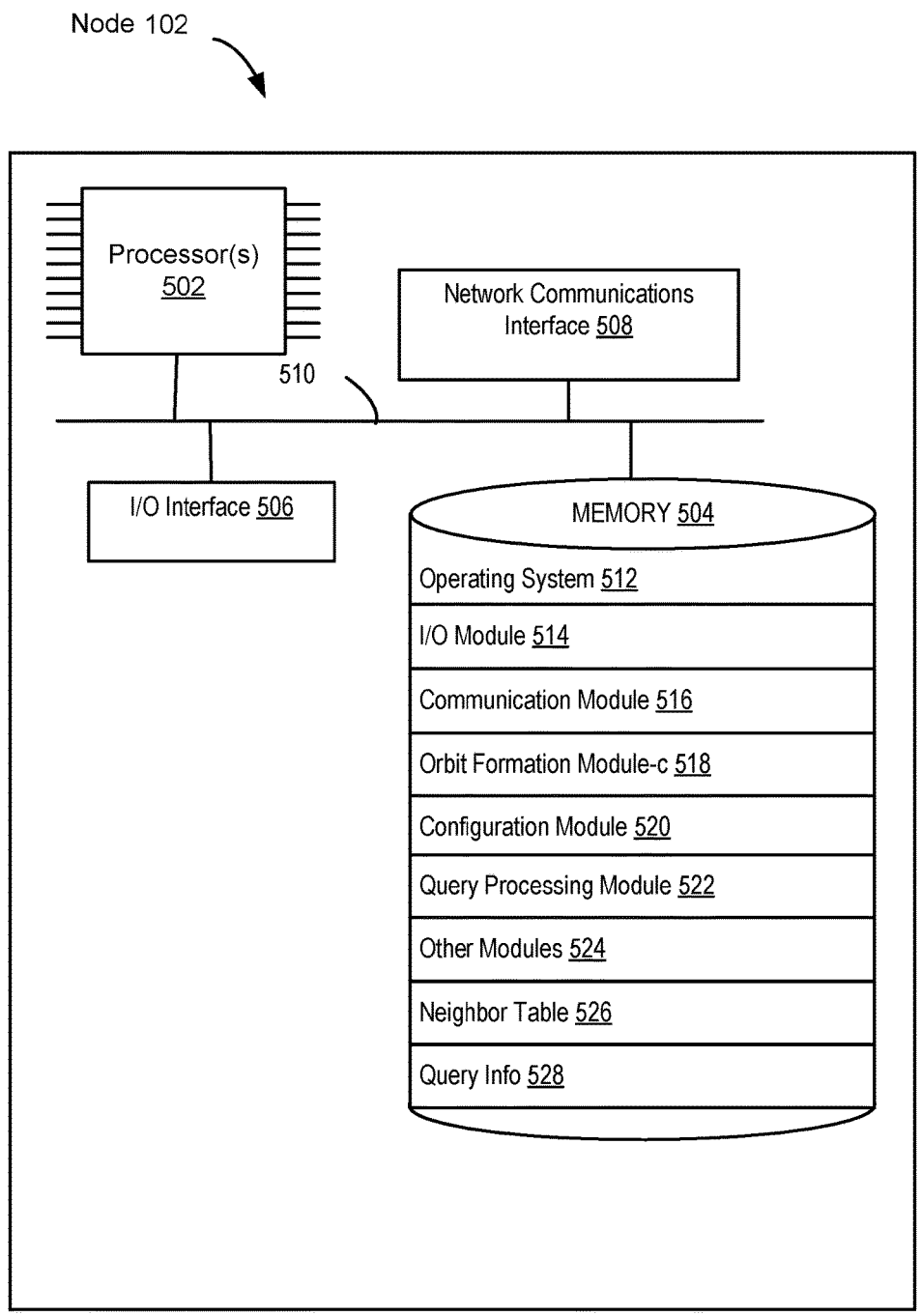
FIG. 5 is a block diagram of an exemplary node in the linear communication orbit in accordance with some embodiments.

FIG. 5 is a block diagram of an exemplary machine 102 shown in FIG. 1. In some implementations, machine 102 includes one or more processors 502, memory 504 for storing programs and instructions for execution by one or more processors 502, one or more communications interfaces such as input/output interface 506 and network interface 508, and one or more communications buses 510 for interconnecting these components.

In some embodiments, input/output interface 506 includes a display and input devices such as a keyboard, a mouse or a track-pad. In some embodiments, communication buses 510 include circuitry (sometimes called a chipset) that interconnects and controls communications between system components. In some embodiments, memory 504 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. In some embodiments, memory 504 includes one or more storage devices remotely located from the one or more processors 502. In some embodiments, memory 504, or alternatively the non-volatile memory device(s) within memory 504, comprises a non-transitory computer readable storage medium.

In some embodiments, memory 504 or alternatively the non-transitory computer readable storage medium of memory 504 stores the following programs, modules and data structures, instructions, or a subset thereof:

- Operating System 512 that includes procedures for handling various basic system services and for performing hardware dependent tasks.
- I/O module 514 that includes procedures for handling various basic input and output functions through one or more input and output devices.
- Communication module 516 that is used for connecting machine 102 to other machines (e.g., other machines 102 in network 100) or servers (e.g., server 108) via one or more network communication interfaces 508 (wired or wireless) and one or more communication networks, such as the Internet, other wide area networks, local area networks, metropolitan area networks, and so on.
- Orbit formation module 518 that includes instructions implementing a predetermined set of rules for creating, maintaining, and repairing the linear communication orbit for network and system management.
- Configuration module 520 that includes instructions for forming the neighbor table, and identifying forward and backward direct contacts for the node.
- Query processing module 522 that includes instructions for creating query messages, sending query messages, storing query states, updating query states, creating acknowledgements, sending and forwarding acknowledgements, generating answers for queries, and reporting results.

Other modules 524 that include instructions for handling other functions and aspects described herein.

Neighbor table 526 that includes the addresses of machine 102's neighbors at different similarity levels.

Query Information Cache 528 that stores queries, query states, collected answers, etc.

FIG. 5 is merely illustrative of the structures of machines 102. A person skilled in the art would recognize that particular embodiments of machines 102 may include more or fewer components than those shown. One or more modules may be divided into sub-modules, and/or one or more functions may be provided by different modules than those shown.

The foregoing description has been provided with reference to specific embodiments. However, the illustrative discussions above are not intended to be exhaustive or to be limiting to the precise forms disclosed. Many modifications and variations are possible in view of the above teachings. The embodiments were chosen and described in order to best explain the principles disclosed and their practical applications, to thereby enable others to best utilize the disclosure and various embodiments with various modifications as are suited to the particular use contemplated.

What is claimed is:

1. A method of providing message communications with failure detection and recovery in a linear communication orbit formed by a non-static collection of machines, the method comprising:

at a first machine of the non-static collection of machines forming the linear communication orbit, wherein the first machine has a set of direct contacts comprising a set of machines distributed along the linear communication orbit:

monitoring a current propagation state of a first query that has departed from the first machine to travel in a forward direction along the linear communication orbit;

detecting a propagation failure of the first query corresponding to the current propagation state of the first query, including detecting a failure to receive an acknowledgement of the first query from a first direct contact among the set of direct contacts within a predetermined timeout corresponding to the first direct contact, wherein the first direct contact is located in an unanswered range of the first query downstream of the first machine along the linear communication orbit, and wherein there is at least one machine located between the first machine and the first direct contact of the first machine along the linear communication orbit; and in accordance with detection of the propagation failure of the first query corresponding to the current propagation state of the first query, sending the first query directly to the first direct contact of the first machine, wherein the first direct contact of the first machine is configured to initiate failure recovery within at least part of a respective segment of the linear communication orbit between the first machine and the first direct contact of the first machine.

2. The method of claim 1, including:

detecting that sending the first query directly to the first direct contact of the first machine has failed; and in accordance with the failure to send the first query directly to the first direct contact of the first machine, sending the first query directly to a second direct contact among the set of direct contacts of the first machine that is located within the unanswered range of the first query downstream of the first machine along the linear communication orbit, wherein the second direct contact is located downstream of the first direct contact of the first machine along the linear communication orbit, and wherein the second direct contact is configured to initiate failure recovery within at least part of a respective segment of the linear communication orbit between the first machine and the second direct contact of the first machine.

3. The method of claim 2, including:

determining a respective responsibility tier of the first machine for the first query based on a predetermined responsibility hierarchy rule, wherein the predetermined responsibility hierarchy rule assigns machines in the non-static collection of machines into a respective responsibility hierarchy for the first query, and wherein the second direct contact of the first machine has a higher responsibility tier than the first direct contact of the first machine in the respective responsibility hierarchy for the first query.

4. The method of claim 3, including:

updating the current propagation state of the first query based on new known positions of the first query in the linear communication orbit; and ceasing to monitor the current propagation state of the first query in accordance with a determination that the first query has reached a second machine downstream of the first machine along the linear communication orbit that has a higher responsibility tier than the first machine in the respective responsibility hierarchy for the first query.

5. The method of claim 1, including:

receiving a second query directly from a third direct contact among the set of direct contacts of the first machine, wherein the second query was propagating through the linear communication orbit in the forward direction prior to the first machine receiving the second query directly from the third direct contact, the third direct contact is located in an unanswered range of the second query upstream of the first machine along the linear communication orbit, and wherein there is at least one machine located between the first machine and the third direct contact of the first machine along the linear communication orbit; and in response to receiving the second query directly from the third direct contact, sending the second query directly to a fourth direct contact among the set of direct contacts of the first machine to recover from a propagation failure of the second query between the first machine and the third direct contact of the first machine, wherein the second query resumes propagation in the forward direction within at least part of a respective segment of the linear communication orbit between the third direct contact of the first machine and the first machine.

6. The method of claim 5, including:

detecting that sending the second query directly to the fourth direct contact of the first machine has failed; and in accordance with the failure to send the second query directly to the fourth direct contact of the first machine, sending the second query directly to a fifth direct contact among the set of direct contacts of the first machine that is located in the unanswered range of the second query downstream of the fourth direct contact of the first machine along the linear communication orbit, wherein the second query resumes propagation in the forward direction within at least part of a respective segment of the linear communication orbit between the fourth direct contact of the first machine and the first machine.

7. The method of claim 6, including:
determining a respective responsibility tier of the first machine for the second query based on a predetermined responsibility hierarchy rule, wherein the predetermined responsibility hierarchy rule assigns machines in the non-static collection of machines into a respective responsibility hierarchy for the second query, and wherein the fifth direct contact of the first machine has a lower responsibility tier than the fourth direct contact of the first machine in the respective responsibility hierarchies of the second query.

8. A non-transitory computer-readable medium, having instructions stored thereon, which when executed by one or more processors cause the processors to perform operations comprising:
at a first machine of a non-static collection of machines forming a linear communication orbit, wherein the first machine has a set of direct contacts comprising a set of machines distributed along the linear communication orbit:
monitoring a current propagation state of a first query that has departed from the first machine to travel in a forward direction along the linear communication orbit;
detecting a propagation failure of the first query corresponding to the current propagation state of the first query, including detecting a failure to receive an acknowledgement of the first query from a first direct contact among the set of direct contacts within a predetermined timeout corresponding to the first direct contact, wherein the first direct contact is located in an unanswered range of the first query downstream of the first machine along the linear communication orbit, and wherein there is at least one machine located between the first machine and the first direct contact of the first machine along the linear communication orbit; and
in accordance with detection of the propagation failure of the first query corresponding to the current propagation state of the first query, sending the first query directly to the first direct contact of the first machine, wherein the first direct contact of the first machine is configured to initiate failure recovery within at least part of a respective segment of the linear communication orbit between the first machine and the first direct contact of the first machine.

9. The non-transitory computer-readable medium of claim 8, wherein the operations include:
detecting that sending the first query directly to the first direct contact of the first machine has failed; and
in accordance with the failure to send the first query directly to the first direct contact of the first machine, sending the first query directly to a second direct contact among the set of direct contacts of the first machine that is located within the unanswered range of the first query downstream of the first machine along the linear communication orbit, wherein the second direct contact is located downstream of the first direct contact of the first machine along the linear communication orbit, and wherein the second direct contact is configured to initiate failure recovery within at least part of a respective segment of the linear communication orbit between the first machine and the second direct contact of the first machine.

10. The non-transitory computer-readable medium of claim 9, wherein the operations include:
determining a respective responsibility tier of the first machine for the first query based on a predetermined responsibility hierarchy rule, wherein the predetermined responsibility hierarchy rule assigns machines in the non-static collection of machines into a respective responsibility hierarchy for the first query, and wherein the second direct contact of the first machine has a higher responsibility tier than the first direct contact of the first machine in the respective responsibility hierarchy for the first query.

11. The non-transitory computer-readable medium of claim 10, wherein the operations include:
updating the current propagation state of the first query based on new known positions of the first query in the linear communication orbit; and
ceasing to monitor the current propagation state of the first query in accordance with a determination that the first query has reached a second machine downstream of the first machine along the linear communication orbit that has a higher responsibility tier than the first machine in the respective responsibility hierarchy for the first query.

12. The non-transitory computer-readable medium of claim 8, wherein the operations include:
receiving a second query directly from a third direct contact among the set of direct contacts of the first machine, wherein the second query was propagating through the linear communication orbit in the forward direction prior to the first machines receiving the second query directly from the third direct contact, the third direct contact is located in an unanswered range of the second query upstream of the first machine along the linear communication orbit, and wherein there is at least one machine located between the first machine and the third direct contact of the first machine along the linear communication orbit; and
in response to receiving the second query directly from the third direct contact, sending the second query directly to a fourth direct contact among the set of direct contacts of the first machine to recover from a propagation failure of the second query between the first machine and the third direct contact of the first machine, wherein the second query resumes propagation in the forward direction within at least part of a respective segment of the linear communication orbit between the third direct contact of the first machine and the first machine.

13. The non-transitory computer-readable medium of claim 12, wherein the operations include:
detecting that sending the second query directly to the fourth direct contact of the first machine has failed; and
in accordance with the failure to send the second query directly to the fourth direct contact of the first machine, sending the second query directly to a fifth direct contact among the set of direct contacts of the first machine that is located in the unanswered range of the second query downstream of the fourth direct contact of the first machine along the linear communication orbit, wherein the second query resumes propagation in the forward direction within at least part of a respective segment of the linear communication orbit between the fourth direct contact of the first machine and the first machine.

14. The non-transitory computer-readable medium of claim 13, wherein the operations include:

determining a respective responsibility tier of the first machine for the second query based on a predetermined responsibility hierarchy rule, wherein the predetermined responsibility hierarchy rule assigns machines in the non-static collection of machines into a respective responsibility hierarchy for the second query, and wherein the fifth direct contact of the first machine has a lower responsibility tier than the fourth direct contact of the first machine in the respective responsibility hierarchies of the second query.

15. A first machine, comprising:
one or more processors; and
memory having instructions stored thereon, which when executed by the one or more processors cause the processors to perform operations, wherein:
the first machine is among a non-static collection of machines forming a linear communication orbit,
the first machine has a set of direct contacts comprising a set of machines distributed along the linear communication orbit, and
the operations include:
  monitoring a current propagation state of a first query that has departed from the first machine to travel in a forward direction along the linear communication orbit;
  detecting a propagation failure of the first query corresponding to the current propagation state of the first query, including detecting a failure to receive an acknowledgement of the first query from a first direct contact among the set of direct contacts within a predetermined timeout corresponding to the first direct contact, wherein the first direct contact is located in an unanswered range of the first query downstream of the first machine along the linear communication orbit, and wherein there is at least one machine located between the first machine and the first direct contact of the first machine along the linear communication orbit; and
  in accordance with detection of the propagation failure of the first query corresponding to the current propagation state of the first query, sending the first query directly to the first direct contact of the first machine, wherein the first direct contact of the first machine is configured to initiate failure recovery within at least part of a respective segment of the linear communication orbit between the first machine and the first direct contact of the first machine.

16. The first machine of claim 15, wherein the operations include:
  detecting that sending the first query directly to the first direct contact of the first machine has failed; and
  in accordance with the failure to send the first query directly to the first direct contact of the first machine, sending the first query directly to a second direct contact among the set of direct contacts of the first machine that is located within the unanswered range of the first query downstream of the first machine along the linear communication orbit, wherein the second direct contact is located downstream of the first direct contact of the first machine along the linear communication orbit, and wherein the second direct contact is configured to initiate failure recovery within at least part of a respective segment of the linear communication orbit between the first machine and the second direct contact of the first machine.

17. The first machine of claim 16, wherein the operations include:
  determining a respective responsibility tier of the first machine for the first query based on a predetermined responsibility hierarchy rule, wherein the predetermined responsibility hierarchy rule assigns machines in the non-static collection of machines into a respective responsibility hierarchy for the first query, and wherein the second direct contact of the first machine has a higher responsibility tier than the first direct contact of the first machine in the respective responsibility hierarchy for the first query.

18. The first machine of claim 17, wherein the operations include:
  updating the current propagation state of the first query based on new known positions of the first query in the linear communication orbit; and
  ceasing to monitor the current propagation state of the first query in accordance with a determination that the first query has reached a second machine downstream of the first machine along the linear communication orbit that has a higher responsibility tier than the first machine in the respective responsibility hierarchy for the first query.

19. The first machine of claim 15, wherein the operations include:
  receiving a second query directly from a third direct contact among the set of direct contacts of the first machine, wherein the second query was propagating through the linear communication orbit in the forward direction prior to the first machine receiving the second query directly from the third direct contact, the third direct contact is located in an unanswered range of the second query upstream of the first machine along the linear communication orbit, and wherein there is at least one machine located between the first machine and the third direct contact of the first machine along the linear communication orbit; and
  in response to receiving the second query directly from the third direct contact, sending the second query directly to a fourth direct contact among the set of direct contacts of the first machine to recover from a propagation failure of the second query between the first machine and the third direct contact of the first machine, wherein the second query resumes propagation in the forward direction within at least part of a respective segment of the linear communication orbit between the third direct contact of the first machine and the first machine.

20. The first machine of claim 19, wherein the operations include:
  detecting that sending the second query directly to the fourth direct contact of the first machine has failed; and
  in accordance with the failure to send the second query directly to the fourth direct contact of the first machine, sending the second query directly to a fifth direct contact among the set of direct contacts of the first machine that is located in the unanswered range of the second query downstream of the fourth direct contact of the first machine along the linear communication orbit, wherein the second query resumes propagation in the forward direction within at least part of a respective segment of the linear communication orbit between the fourth direct contact of the first machine and the first machine.

21. The first machine of claim 20, wherein the operations include:
  determining a respective responsibility tier of the first machine for the second query based on a predetermined responsibility hierarchy rule, wherein the predetermined responsibility hierarchy rule assigns machines in the non-static collection of machines into a respective responsibility hierarchy for the second query, and wherein the fifth direct contact of the first machine has a lower responsibility tier than the fourth direct contact of the first machine in the respective responsibility hierarchies of the second query.

* * * * *